US009477322B2

(12) United States Patent
Noris et al.

(10) Patent No.: US 9,477,322 B2
(45) Date of Patent: Oct. 25, 2016

(54) COMMUNICATION AND ACADEMIC ACHIEVEMENT ASSISTIVE DEVICE, SYSTEM, AND METHOD

(76) Inventors: Michelle Denise Noris, Astoria, NY (US); Joshua Justin Weitzman, Astoria, NY (US)

(*) Notice: Subject to any disclaimer, the term of this patent is extended or adjusted under 35 U.S.C. 154(b) by 756 days.

(21) Appl. No.: 13/359,974

(22) Filed: Jan. 27, 2012

(65) Prior Publication Data

US 2012/0194439 A1 Aug. 2, 2012

Related U.S. Application Data

(60) Provisional application No. 61/436,858, filed on Jan. 27, 2011.

(51) Int. Cl.
| | |
|---|---|
| G06F 3/02 | (2006.01) |
| G06F 3/023 | (2006.01) |
| G06F 3/0484 | (2013.01) |
| G06F 3/0488 | (2013.01) |
| G06F 9/44 | (2006.01) |
| G09B 7/02 | (2006.01) |

(Continued)

(52) U.S. Cl.
CPC .............. G06F 3/0219 (2013.01); G09B 19/00 (2013.01); G09B 21/00 (2013.01); *A47B 2200/0076* (2013.01); *B41J 29/14* (2013.01); *G06F 3/0238* (2013.01); *G06F 3/04842* (2013.01); *G06F 3/04886* (2013.01); *G06F 9/4443* (2013.01); *G09B 7/02* (2013.01)

(58) Field of Classification Search
CPC ......... G06F 9/4443; G09B 7/02; B41J 29/14
USPC ........ 345/172; 434/118, 169, 176, 178, 201, 434/210, 322–364, 428; 715/702, 761, 769, 715/771, 773, 778, 788, 810, 818, 825, 835
See application file for complete search history.

(56) References Cited

U.S. PATENT DOCUMENTS 5,141,343 A * 8/1992 Roylance .................. B41J 5/10
200/5 R
5,176,520 A * 1/1993 Hamilton ..................... 434/350

(Continued)

OTHER PUBLICATIONS

Canadian Patent Application No. 2,766,420, Office Action dated Dec. 10, 2013.

*Primary Examiner* — Eric J Bycer
(74) *Attorney, Agent, or Firm* — Kane Kessler, P.C.; Barry E. Negrin

(57) ABSTRACT

Apparatus and method for providing assistance in communication and academic achievement to individuals possessing fine motor coordination impairment. A computer is provided having software and a storage medium having a plurality of potential user expressions. At least one user screen is in communication with the computer upon which a plurality of potential user expressions are displayable. A plurality of widely spaced apart controls are provided in association with the user screen corresponding to the potential user expressions. When the user wishes to select one of the potential user expressions, the user operates the control that corresponds to the desired potential user expression using gross motor movements. A primary component is image-based for pre-literate users, and a secondary component is character-based for literate users. In the primary component, an operator sends images from which the user chooses. In the secondary component, the user selects characters for a two-dimensional content area.

51 Claims, 28 Drawing Sheets

(51) Int. Cl.
*G09B 19/00* (2006.01)
*G09B 21/00* (2006.01)
*B41J 29/14* (2006.01)

(56) References Cited

U.S. PATENT DOCUMENTS

| | | | | |
|---|---|---|---|---|
| 5,219,291 | A * | 6/1993 | Fong et al. | 434/323 |
| 5,220,652 | A * | 6/1993 | Rowley | G06F 3/0489 345/156 |
| 5,452,960 | A * | 9/1995 | Kuhlenschmidt | 400/487 |
| 5,667,319 | A * | 9/1997 | Satloff | 400/472 |
| 5,749,736 | A * | 5/1998 | Griswold et al. | 434/322 |
| 5,842,869 | A * | 12/1998 | McGregor et al. | 434/201 |
| 5,936,614 | A * | 8/1999 | An et al. | 345/173 |
| 5,995,985 | A * | 11/1999 | Cai | 715/201 |
| 6,005,549 | A * | 12/1999 | Forest | 345/157 |
| 6,018,617 | A * | 1/2000 | Sweitzer et al. | 358/1.15 |
| 6,271,835 | B1 * | 8/2001 | Hoeksma | G06F 3/04886 345/168 |
| 6,650,254 | B1 * | 11/2003 | Rix | G06F 3/0202 341/20 |
| 6,832,355 | B1 * | 12/2004 | Duperrouzel et al. | 715/788 |
| 7,020,882 | B1 * | 3/2006 | Lewallen | 719/328 |
| 7,176,898 | B2 | 2/2007 | Litwiller | |
| 2001/0028712 | A1 * | 10/2001 | Lahr | G06F 1/1622 379/368 |
| 2002/0058236 | A1 * | 5/2002 | Zhang | 434/236 |
| 2002/0087560 | A1 * | 7/2002 | Bardwell | 707/100 |
| 2002/0154037 | A1 * | 10/2002 | Houston | 341/21 |
| 2003/0058219 | A1 * | 3/2003 | Shaw | G06F 3/0338 345/161 |
| 2003/0071787 | A1 * | 4/2003 | Gerstacker | G06F 3/0334 345/163 |
| 2003/0152895 | A1 * | 8/2003 | Reisz et al. | 434/178 |
| 2004/0051295 | A1 * | 3/2004 | Gross et al. | 281/15.1 |
| 2004/0056781 | A1 * | 3/2004 | Rix | G06F 3/0202 341/20 |
| 2004/0216059 | A1 * | 10/2004 | Vong | G06F 3/1431 715/840 |
| 2005/0099397 | A1 * | 5/2005 | Ono | H03M 11/08 345/172 |
| 2006/0045599 | A1 * | 3/2006 | Ongkojoyo | G06F 3/0202 400/483 |
| 2006/0105312 | A1 * | 5/2006 | McClimon et al. | 434/350 |
| 2006/0200779 | A1 * | 9/2006 | Taylor | G06F 3/0481 715/781 |
| 2007/0020604 | A1 * | 1/2007 | Chulet | 434/350 |
| 2007/0231776 | A1 * | 10/2007 | Saldutti | 434/129 |
| 2008/0129695 | A1 * | 6/2008 | Li | G06F 3/03543 345/163 |
| 2009/0097753 | A1 * | 4/2009 | Millington | G06F 3/0233 382/187 |
| 2009/0233261 | A1 * | 9/2009 | Mindak | 434/157 |
| 2009/0285616 | A1 * | 11/2009 | Longobardi | G06F 1/1616 400/489 |
| 2010/0167255 | A1 * | 7/2010 | Shane et al. | 434/307 R |
| 2010/0177048 | A1 * | 7/2010 | Semenets et al. | 345/173 |

* cited by examiner

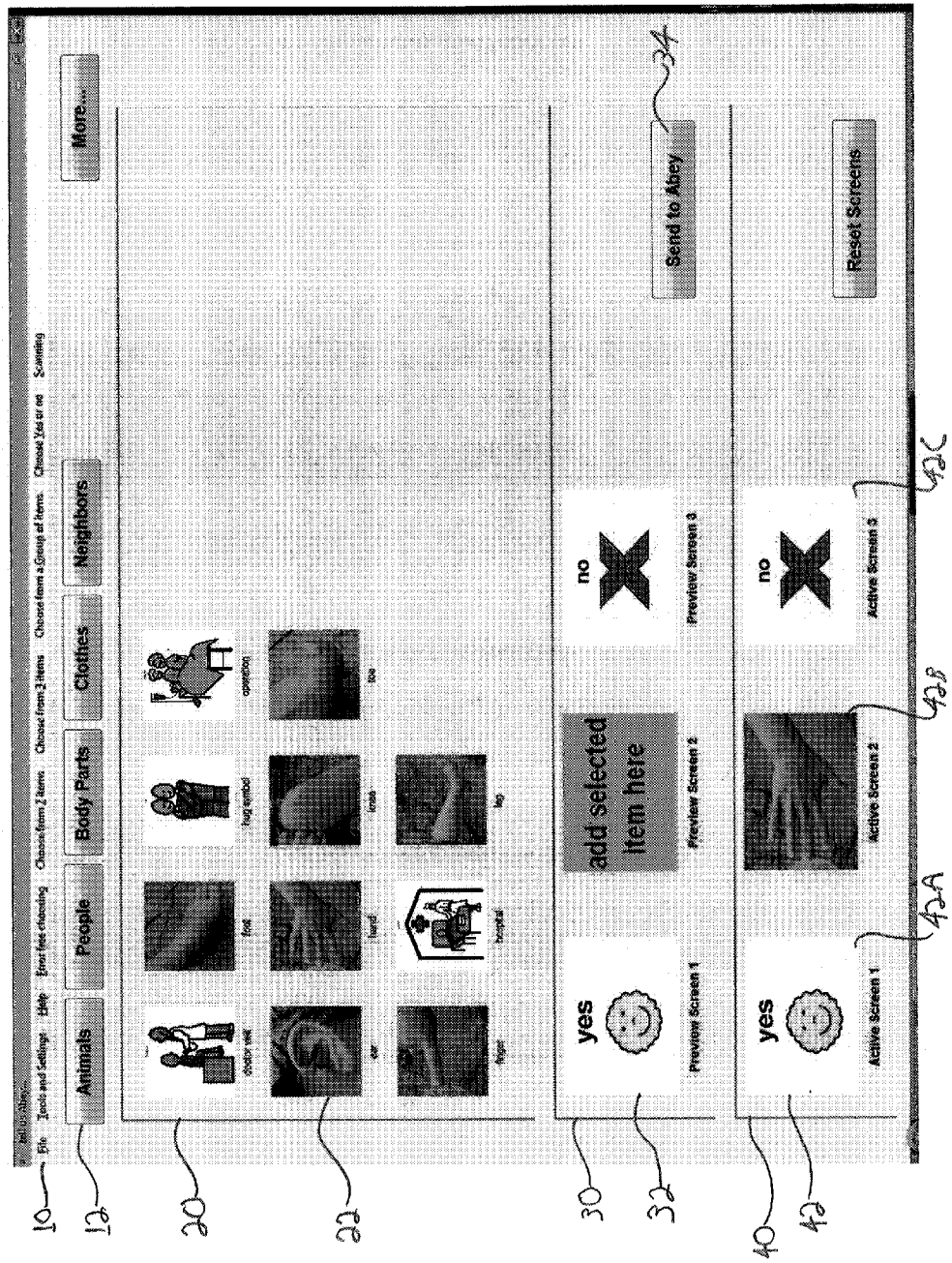

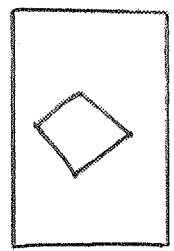
FIG. 8A
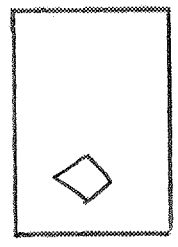
FIG. 8B
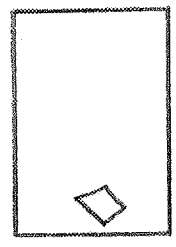
FIG. 8C
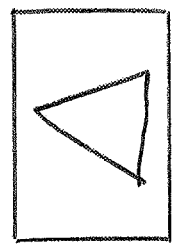
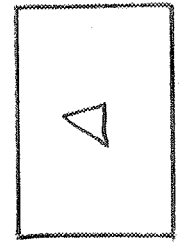
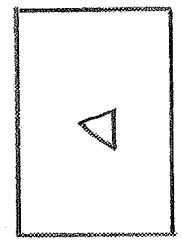
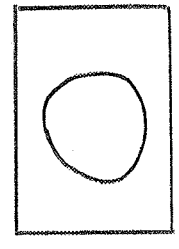
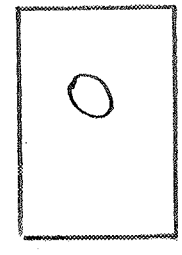
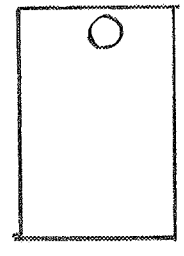

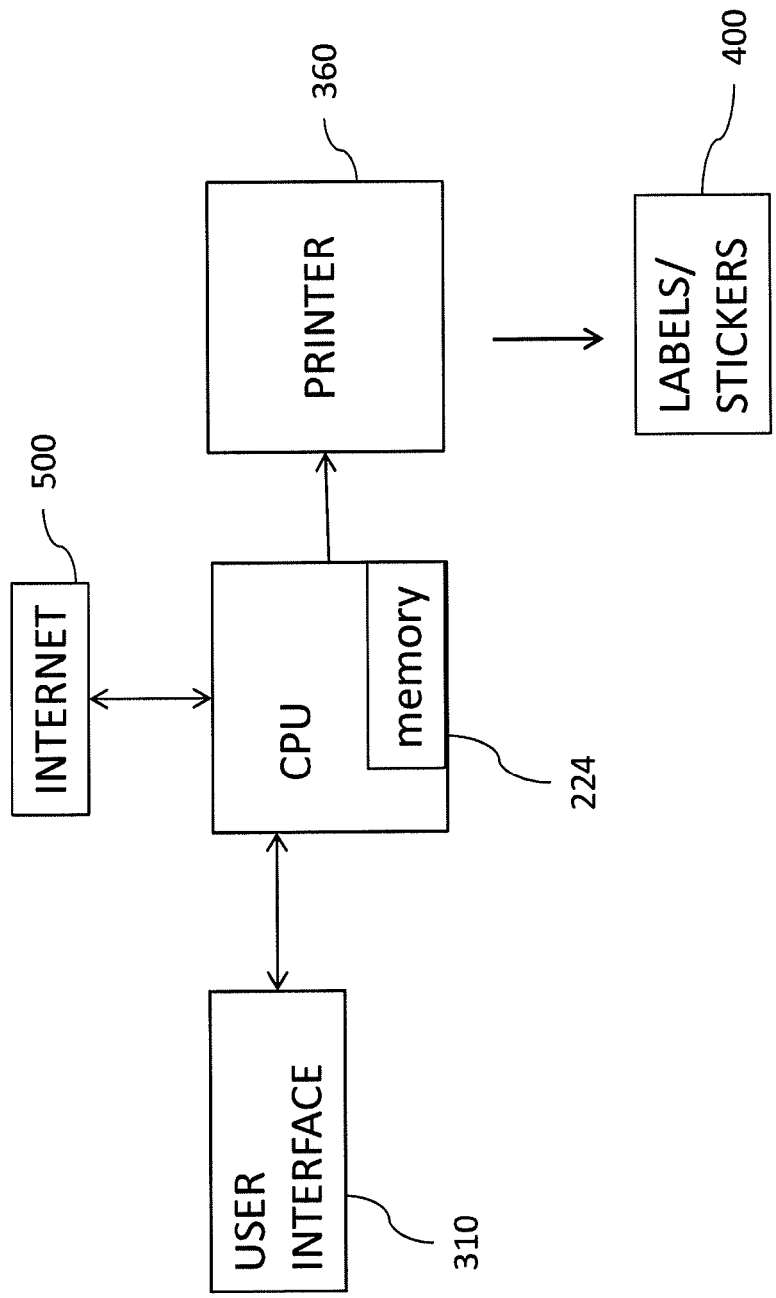

COMMUNICATION AND ACADEMIC ACHIEVEMENT ASSISTIVE DEVICE, SYSTEM, AND METHOD

RELATED APPLICATIONS

Domestic priority is claimed from U.S. Provisional Patent Application No. 61/436,858 filed Jan. 27, 2011, entitled "Communication and Academic Achievement Assistive Device and System", the teachings of which are incorporated by reference herein.

BACKGROUND OF THE INVENTION

1. Field of the Invention

The invention is directed to assistive communication devices. More specifically the invention is directed to devices, systems, and methods that enable or assist individuals with cognitive and/or physical delays or impairments to communicate in an academic as well as conversational setting.

2. Description of Related Art

Typical children attend school, and typical adults go to work, and perform a variety of tasks such as answering questions (true/false, fill in the blank, multiple choice, etc.), writing, doing linear arithmetic, doing vertical arithmetic, and the like. There are a number of atypical children and adults who for one reason or another cannot perform these tasks in a conventional manner using a writing implement and paper, or a keyboard and computer, or their voices.

One possible reason may be related to the individual's motor skills. Motor skills are motions carried out when the brain, nervous system, and muscles work together. Fine motor skills are small movements—such as grabbing something with your thumb and forefinger—that use the small muscles of the fingers, toes, wrists, lips, and tongue. Gross motor skills are the bigger movements—such as running and jumping—that use the large muscles in the arms, legs, torso, and feet. Gross motor skills are defined as the movements of the large muscles of the body. Thus, manipulating a pen or pencil or a conventional keyboard requires significant fine motor coordination, whereas hitting a large button with the palm or side of a hand falls under the category of a gross motor skill. Some individuals have fine motor coordination difficulties that make it impossible to wield a pen or type on a conventional qwerty keyboard. In addition or in the alternative, other individuals have speech impairments that may hinder or outright preclude the person from speaking in a conventional manner.

Yet having difficulty communicating is hardly indicative of not having anything to say. Often with certain assistive devices, atypical individuals are able to communicate with others. Several devices exist in this field, for example, the TANGO™ device, sold by DYNAVOX MAYER-JOHNSON of Pittsburgh, Pa. The TANGO™ device is a small device, roughly 8" by 3", and attachable to a wheelchair and includes several small primary buttons along with several other small control buttons. All of the controls of the TANGO™ device are small (certainly given the small overall size of the device) and are intended to be operated by the user's fingers. The small or fine motor coordination required to do so is well beyond the ability of many disabled children and also beyond the ability of those adults with fine motor coordination difficulties. Another drawback of the TANGO™ device is that it is focused on casual communication and preset phrases that are grouped together by topic for quick but unoriginal communication. Original speech that evinces the user's conversational style is not a main objective of the TANGO™ device. Additionally, the main display is one line of text. This prevents a user from communicating in any two-dimensional manner, e.g., performing vertical arithmetic, drawing, or the like.

Other assistive communication devices include the DYNAVOX MAESTRO™, the ECO2 made by Prentke Romich of Wooster, Ohio, and the SONO KEY™ made by Tobii Technology of Danderyd, Sweden. These are substantially similar devices that suffer from common deficiencies. For one, like the TANGO™ device, all of these devices are small, making them difficult to operate for those with poor fine motor control. Each of these devices has a single screen ranging from 9" to 15" with unlimited on-screen buttons that lack any tactile feedback. Further, the location and size of these onscreen buttons are set up by the person who sets up the communication board for the user. This often creates an inconsistency in the location of the control buttons and that can work at cross purposes with the end user. Relatedly, these devices require advanced thought by the operator to assemble boards for each choice/lesson, etc. A supervisory operator must spend time customizing each board for the user to have maximum success.

Accordingly, there is a long-felt need to provide an assistive communication device suitable for those with all levels of physical and cognitive ability that can be easily set up and used "out of the box" and provide original communication capabilities, not limited to single lines of text or preset words or phrases.

Additionally, there is a long-felt need to provide an assistive communication device or system for use in an academic setting. Currently, there are no devices for the disabled user to perform tasks that are asked of a typically developing child in a school setting. These tasks include: editing written work, preparing and revising lengthy written papers that include footnotes; composing creative writing with chapters and/or atypical punctuation or formatting (such as poetry); solving complex arithmetic and algebraic problems; graphing the results of a science experiment; drawing and painting without assistance; and composing music, to name a few. These tasks are all activities that we expect of typical children in school (indeed, many are required by standard curricula) but are dismissed as out of reach of the physically disabled by all of the other assistive communication devices.

SUMMARY OF THE INVENTION

The invention is a system of assistive augmentative communication devices that make communication possible for children and/or adults who are non-verbal, speech delayed, or who have other disabilities. The system is a combination of hardware and software that create a user interface that assists disabled children in communication and academic achievement. The system has a primary component that is image based and a secondary component that is text based. This makes it possible to follow a child from the earliest stages of communication as a toddler through the academic settings of a middle or high school student.

In using the primary component, the user pushes a switch below a large image as a means of communicating. The primary component includes a user interface and a supervisory operator interface. The operator proposes one, two, three, or more images to the user via the operator interface. The collections of images are preferably organized by category. Categories may preferably include animals, people, body parts, clothes, neighbors, vehicles, food, toys, activities, and the like. Categories are accessed via large buttons at the top of the operator interface. When a category is accessed, small images of each item in the category appear in the main area of the operator interface. These images can be quickly dragged and dropped into the selection area of the interface. This categorized organization, along with the operator's touchscreen makes it possible to propose images to the user very quickly and with only one hand available. In response to receiving the images from the operator, the user makes a choice by pressing a switch below the desired image.

The secondary component builds on the same user interface approach employed in the primary component. The user pushes a switch under a computer monitor to select the item displayed above. However, in the secondary component, this approach has been adapted for text-based communication. The system provides quick switch access to the letters, numbers, and other items on a standard alpha-numeric keyboard, as well as musical notation. The system allows the user to move around a grid, making non-linear writing, such as a long division problem, possible. This makes it possible for disabled users to communicate in their own "voice." The user is not choosing from a set of pre-written words or phrases.

In a preferred embodiment, the secondary component has six momentary push button switches on the main array, as opposed to the three switches used in the primary component. A six switch configuration allows the selection of a letter of the alphabet in as few as two switch presses. In addition or in the alternative, the user can also access the screen button controls via a mouse or a touchscreen. This method produces the same result as pressing a switch and allows use of the program with no switch array.

In either embodiment, the space between switches helps make the invention viable. Having larger than normal buttons helps as well. For example, in the primary component, a preferred version of the invention uses 5" buttons spaced 12" apart, and in the secondary component, the invention uses 2" buttons spaced 4" apart. Compare this to a conventional keyboard, which has ½" buttons spaced ¼" apart. These require finger dexterity which someone possessing fine motor coordination impairment may not have.

Additionally, pressing or otherwise activating the buttons or switches preferably causes the associated software to generate some form of confirmatory sensory feedback to the user, be it a sound, a vibration (e.g., haptic feedback), a light (either on the button/switch itself or remote therefrom), or the like. This way, the user can be certain that his/her selection was made immediately for each selection.

In overview, the invention includes an apparatus providing assistance in communication and academic achievement to individuals possessing fine motor coordination impairment. A computer having software and a storage medium having a plurality of potential user expressions are provided. At least one user screen is provided in communication with the computer having software upon which a plurality of potential user expressions are displayable. A plurality of widely spaced apart controls, in association with the user screen, correspond to the potential user expressions. When the user wishes to select one of the potential user expressions, the user operates the control that corresponds to the desired potential user expression using gross motor movements. The widely spaced apart controls may preferably be at least one of hand-operated or foot-operated switches. The switches may preferably be tactilely responsive momentary push switches. Spacing between adjacent of the widely spaced apart controls is preferably at least 3 inches, and the size of each of the widely spaced apart controls is preferably at least 1 inch. Optionally, positions of respective controls are adjustable.

Preferably, at least one sensory feedback mechanism is provided in communication with each of the switches. When the user successfully operates one of the switches, the corresponding sensory feedback mechanism is activated to confirm successful operation of the switch to the user.

In one embodiment, the apparatus provides assistance to pre-literate individuals, wherein the plurality of user expressions are image-based. The at least one user screen further includes at least three user screen sections, and the plurality of widely spaced apart controls further includes at least three of the controls, each of the controls corresponding to a respective one of the user screen sections. Operation of one of the three controls selects an image-based user expression appearing on the corresponding one of the user screen sections. Operation of one of the three controls may also cause the selected expression to be displayed on a supplemental display such as another monitor, a large screen or projection device, or the like. The at least three user screen sections include one of i) three discrete display screens, or ii) three sections of a single display screen.

An operator interface is preferably provided in communication with the computer, enabling an operator to select image-based user expressions from the storage medium to present to the user on the user screen sections. The image-based user expressions are preferably sorted into categories. The operator interface in that case further includes a plurality of category buttons, each of the category buttons being associatable with a corresponding of the categories of the image-based user expressions, and an image field. When one of the category buttons is activated, a plurality of image-based user expressions from the selected category appear in the image field. The operator interface preferably further includes a preview field having three image sections each corresponding to one of the user screen sections. The image-based user expressions appearing in the image field are selectable by the operator to appear in the preview field and thence be sendable to the user screen sections. The operator interface may preferably further include functionality buttons enabling selection by the operator amongst different operational modes in how the image-based user expressions are selectable and presentable to the user screen sections. The functionality buttons may preferably restrict to which of a subset of the user screen sections the selected image-based user expressions are presented to the user depending upon which of the operational modes is selected.

The operational modes may include at least one of i) error free choosing mode, in which a single of the image-based user expressions is selected and sent to the user; ii) choose from two of the image-based user expressions mode; iii) choose from three of the image-based user expressions mode; iv) choose from a group of the image-based user expressions exceeding the number of the user screen sections mode; v) yes and no mode, in which a single of the image-based user expressions is selected and sent to one of the user screens along with yes and no choices for the other two of the user screens; vi) scanning mode, in which multiple of the image-based user expressions are sent and are serially highlighted one at a time.

In a second embodiment, the apparatus provides assistance to literate individuals, and the plurality of user expressions are characters. The at least one user screen preferably includes a two-dimensional content area having a plurality of content locations, and a user interface functionality area having six user screen sections. The plurality of widely spaced apart controls preferably further includes six of the controls, each of the controls corresponding to a respective one of the user screen sections. Operation of one of the six controls selects content appearing on the corresponding one of the user screen sections. The six user screen sections may include one of i) three individual screens each having two of the six user screen sections; ii) two individual screens each having three of the six user screen sections; or iii) one main screen having six of the six user screen sections. Content appearing on each of the six user screen sections may include one or multiple characters. When one character appears on one of the six user screen sections, user activation of the corresponding of the controls causes the one character to appear in one of the content locations in the two-dimensional content area. When multiple characters appear on one of the user screen sections, user activation of the corresponding of the controls causes the corresponding multiple characters to be spread out amongst multiple of the user screen sections for subsequent eventual selection of a single character. The characters include at least one of letters, numbers, symbols, content location selectors, or operational mode selectors.

The software preferably includes a plurality of modules, each of the modules corresponding to one of a plurality of operational modes in which the apparatus is selectively usable. A first of the modules may include a free writing module, in which the content includes letters distributed initially with multiple letters assigned to each of the six user screen sections and then, upon activation of one of the controls, the letters assigned to the activated of the controls being distributed singly to each of the controls. A second of the modules may include a yes-no module, wherein the content includes at least yes and no user responses, and possibly other related responses. A third of the modules may include a linear math module, wherein the content includes characters including at least two of numbers, operands, and units, distributed initially with multiple characters assigned to each of the six user screen sections and then, upon activation of one of the controls, the characters assigned to the activated of the controls being distributed singly to each of the controls. A fourth of the modules may include a grid math module, wherein the content includes characters including at least numbers and arrows, distributed initially with multiple characters assigned to each of the six user screen sections and then, upon activation of one of the controls, the characters assigned to the activated of the controls being distributed singly to each of the controls. Selection of one of the arrows chooses one of the content locations in the two-dimensional content area, and subsequent selection of one of the numbers places the selected number in the last chosen of the content locations. One of the controls may be assigned a function in one of the operational modes selectively enabling the user to switch to another of the operational modes.

The apparatus may also include a supplemental display, viewable by at least one other person, upon which content selected to appear in the two-dimensional content area also appears.

Preferably, content displayed in the two-dimensional content area is savable onto the storage medium as a file. The file so stored is preferably retrievable and editable from the storage medium. Preferably, the computer further includes a communication mechanism linkable to an external computer; content displayed in the two-dimensional content area is transferable to and from the external computer. Preferably, the apparatus further includes a printer in communication with the computer; content displayed in the two-dimensional content area is printable. Optionally, the content is printable onto labels adapted to be adhered to a worksheet or workbook.

The invention also includes a method of enabling or assisting communication in individuals possessing fine motor coordination impairment. In one embodiment, the method includes the following steps: i) providing at least one user screen; ii) providing a first plurality of potential user expressions on the at least one user screen; and iii) providing a plurality of widely spaced apart controls, in association with the at least one user screen, corresponding to the potential user expressions. When the user wishes to select a potential user expression, the user operates the control that corresponds to the desired user expression using gross motor movements. The method may also include the step of providing confirmatory sensory feedback to the user upon successful operation of one of the controls by the user.

In one embodiment, step ii) may preferably include the step of enabling an operator to select the first plurality of potential user expressions as a subset from a larger second plurality of potential user expressions, the second plurality of potential user expressions being stored on a computer readable storage medium in communication with the at least one user screen. The potential user expressions may preferably be image-based user expressions. The method may further include providing an operator interface having an image field; organizing the second plurality of potential user expressions into a plurality of categories; and providing a plurality of category buttons associated with the operator interface corresponding to the categories of potential user expressions. When one of the category buttons is activated, a plurality of image-based user expressions from the selected category appear in the image field. The at least one user screen preferably includes a plurality of user screen sections, each of the widely spaced apart controls corresponding to one of the user screen sections. The method preferably further comprises the steps of: providing a preview field having a plurality of image sections each corresponding to one of the user screen sections; selecting image-based user expressions appearing in the image field to appear in the preview field; and sending the selected image-based user expressions appearing in the preview field to the user screen sections. The sending step may further include the steps of varying at least one of the size or the position of an image-based user expression on a user screen section.

In another embodiment, the method may include the step of partitioning the at least one user screen into a two-dimensional content area having a plurality of content locations and a user interface functionality area having six user screen sections. The characters to be provided include at least one of letters, numbers, symbols, content location selectors, or operational mode selectors. The plurality of widely spaced apart controls preferably further include six widely spaced apart controls, each of the controls corresponding to a respective one of the user screen sections. The method preferably further includes the steps of operating one of the six controls to select content appearing on the corresponding one of the user screen sections. Content appearing on each of the six user screen sections includes one or multiple characters. When one character respectively appears on each of the six user screen sections, activating one of the controls causes the corresponding one character to appear in one of the content locations in the two-dimensional content area. When multiple characters respectively appear on each of the user screen sections, activating one of the controls to cause the corresponding multiple characters to be spread out amongst multiple of the user screen sections for subsequent eventual selection of a single character. The method may further include the steps of providing a supplemental display, viewable by at least one person other than the user, in communication with the at least one user screen, and sending selected content appearing in the two-dimensional content area to the supplemental display.

The method may further include the steps of uploading and downloading content to/from the two-dimensional content area from/to an external computer. The method may further include the step of saving content in the two-dimensional content area on a computer readable storage medium. The method may further include the step of printing content in the two-dimensional content area. Preferably, the printing step further includes the steps of printing the content onto labels and adhering the printed-on labels onto a worksheet or workbook.

BRIEF DESCRIPTION OF THE DRAWINGS

FIGS. 2-7 and 9 are representative exemplary screen shots of an image-based assistive communication device in accordance with the primary component of the invention.

FIGS. 8A-C are schematic diagrams illustrating the successive reduction of size of images on the screens of an image-based assistive communication device in accordance with the primary component of the invention.

FIG. 28 is a schematic diagram of one configuration of the secondary component of the invention.

DETAILED DESCRIPTION OF THE INVENTION AND DRAWINGS

Description will now be given with reference to the attached FIGS. 1-28. It should be understood that these figures are exemplary in nature and in no way serve to limit the scope of the invention, which is defined by the claims appearing hereinbelow.

Figure 1:
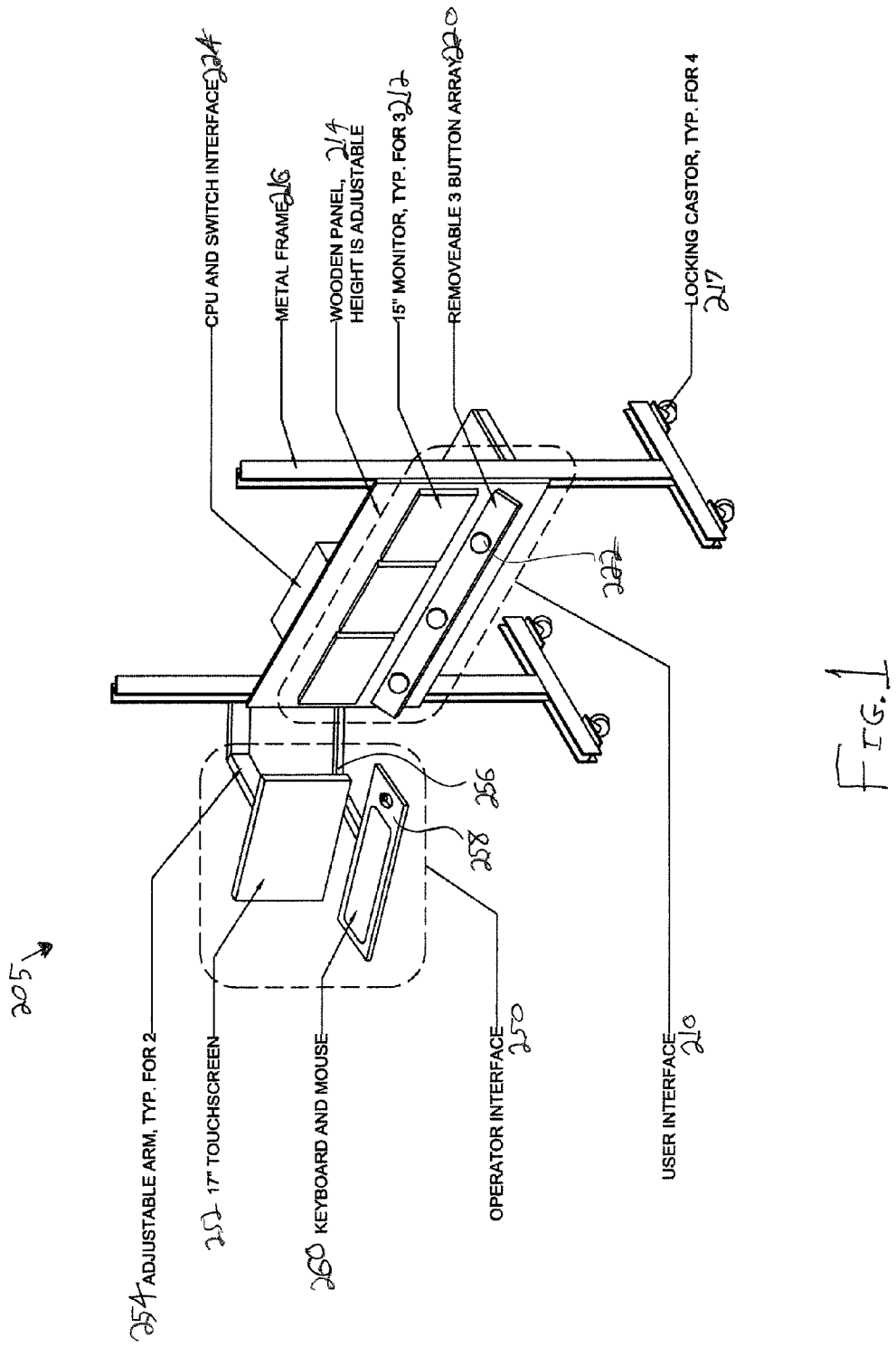
FIG. 1 is a perspective drawing of an exemplary image-based assistive communication device in accordance with the primary component of the invention.

An exemplary embodiment of a device in accordance with the primary, image-based component of the invention is shown in FIG. 1. The primary component 205 includes a user interface 210 and an operator interface 250. Dimensions and materials given are merely an example are not meant to be limiting in any way, except to the extent that the controls be widely spaced apart as will be discussed below.

The user interface preferably includes three computer monitors 212 (e.g., 15" diagonal) mounted to a monitor-holding panel (e.g., made of wood) 214 that is in turn mounted to a frame 216 (e.g., made of metal). The height of monitor holding panel 214 is adjustable upon frame 216 to accommodate the user. Below the three monitors 212, angled towards the user at preferably approximately a 45° angle, is a removable switch array 220. In a preferred embodiment, switch array 220 is approximately 36" long by 6" wide. The switch array has three large (e.g., 5") momentary push switches or buttons 222 widely spaced apart from each other. In a preferred embodiment of the primary component, switches/buttons 222 are spaced 12" apart. Each switch is preferably a different color. Each switch 222 is lined up under one of the monitors 212. The switch array 220 is attached to the monitor holder 214 in any convenient conventional manner, e.g., hook-and-loop fastener, adhesive, fasteners, etc. A preferred electrical connection is made via a 6' self-coiling multi-cable (not shown). The switch array 220 can be removed and placed in the user's lap while seated, or on the tray of a wheelchair, or on the floor for foot activation, or on a table. The entire metal frame 216 preferably has locking swivel castors 217 so it can be easily moved. The central processing unit and switch array interface 224 are mounted to a shelf that is attached to the frame 216 behind the three monitors 212.

The operator interface 250 preferably includes a touch screen computer monitor 252 (e.g., 17" diagonal) mounted to a swinging arm 254 off one side of the main frame 216. The swinging arm 254 allows the touchscreen 252 to tilt, swivel, and move higher and lower. The touchscreen 252 uses resistive touch technology. Below the swinging monitor arm 254 is a swinging arm 256 with a small table 258 that holds an alpha-numeric computer keyboard and/or mouse combination 260. The heights of both the monitor swinging arm 254 and the keyboard swinging arm 256 are adjustable to accommodate the operator.

As an alternative configuration, the same software and functionality is run on a single touchscreen device. The images are smaller, but the operation and logic (to be described below) are exactly the same. The same touchscreen switches between the operator interface and the user interface. The operator sets the mode and images to be sent to the user and then initiates the user interface. The images on the touchscreen can be selected by touching the image itself or by pressing a single attached switch. If desired, a three switch array can be plugged into the unit and used to make a selection as with the preferred embodiment.

As described above briefly, the operator proposes one, two, three, or more images to the user via the operator interface 250. The collections of images are preferably organized by category. When a category is accessed, small images of each item in the category appear in the main area of the operator interface 250. These images can be quickly dragged and dropped into the selection area of the interface. This categorized organization, along with the operator's interface, makes it possible to propose images to the user very quickly. In response to receiving the images from the operator, the user makes a choice by pressing a switch 222 below the desired image.

Figure 2:
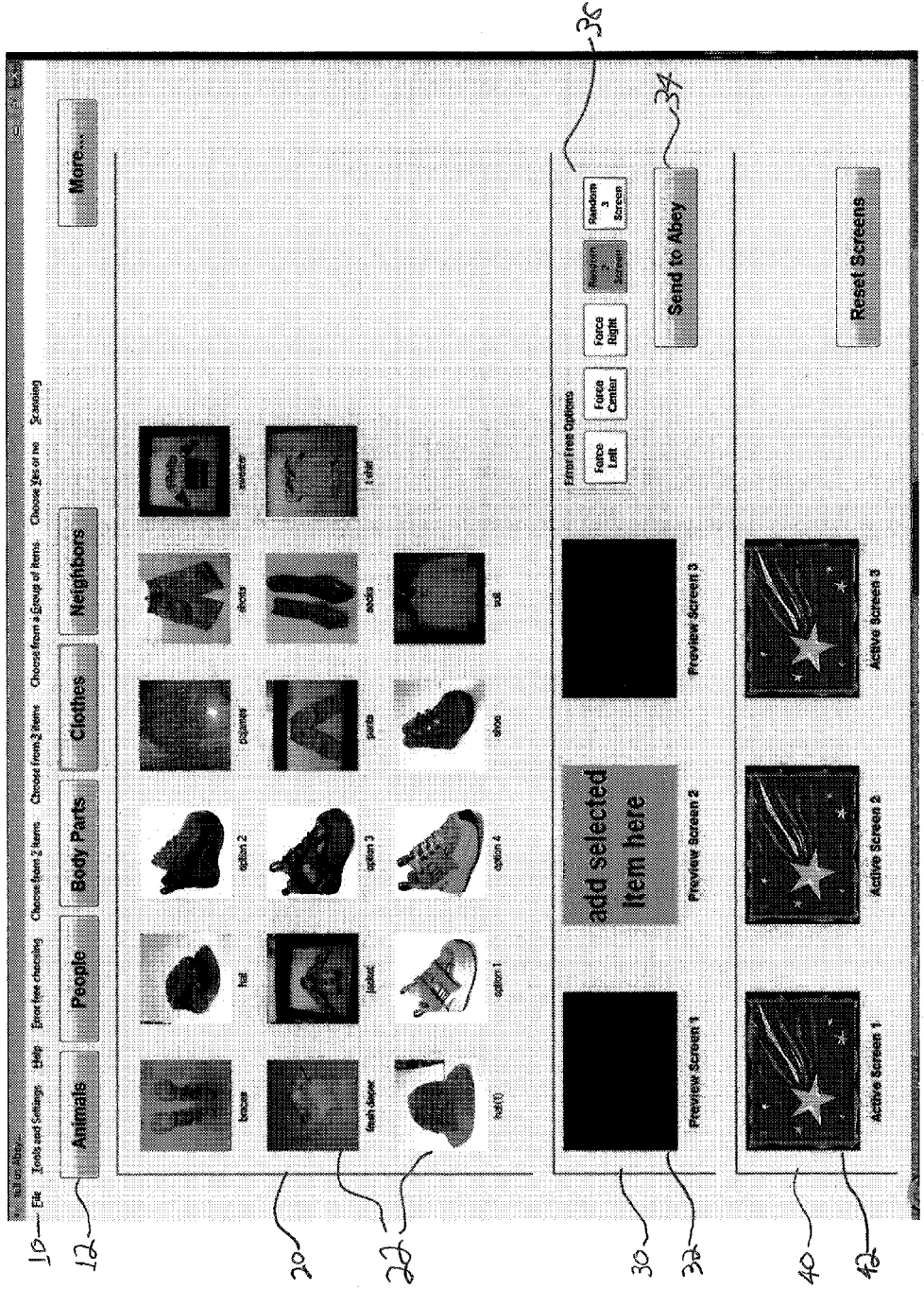
Figure 3:
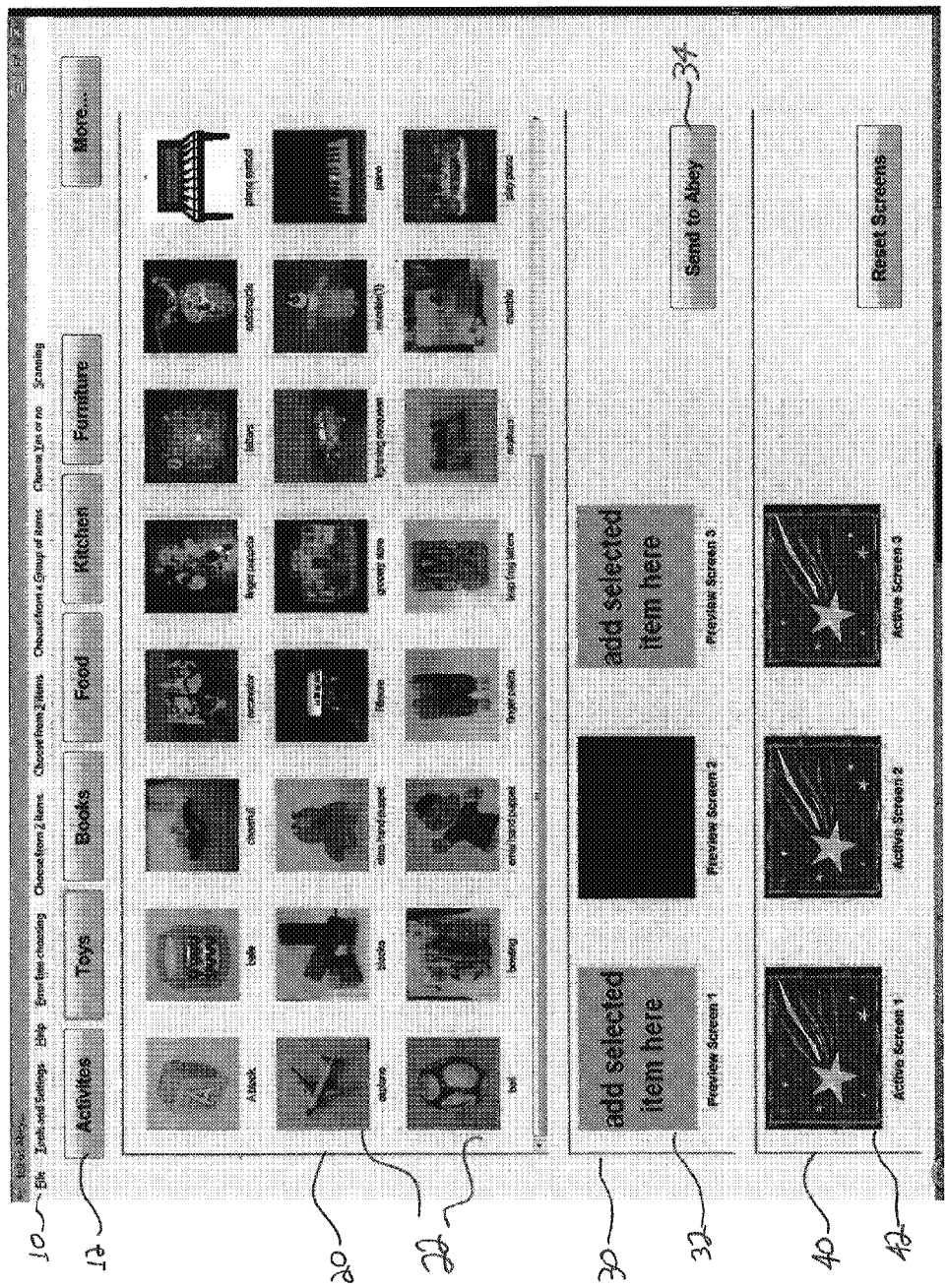
Figure 4:
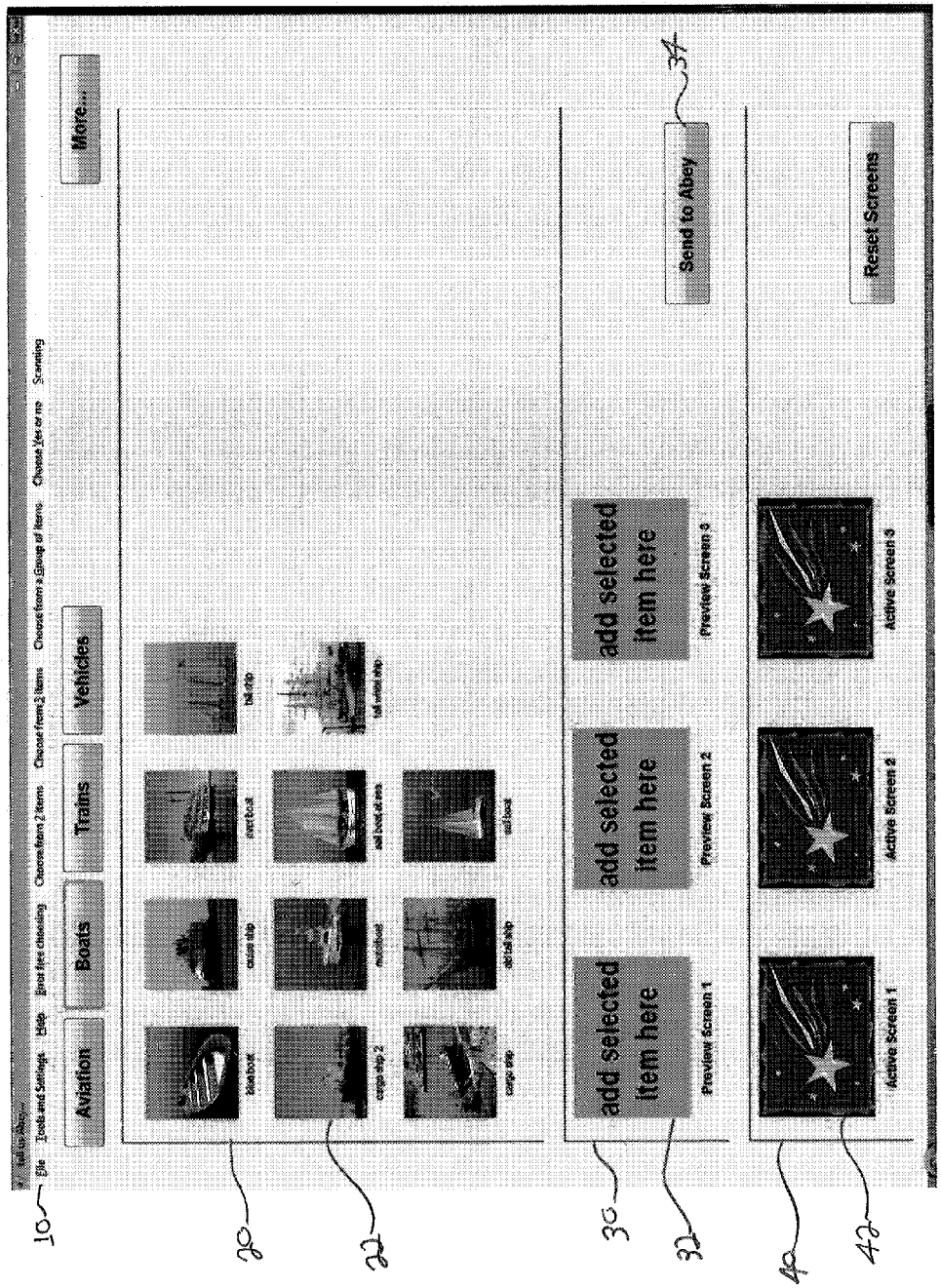
Figure 5:
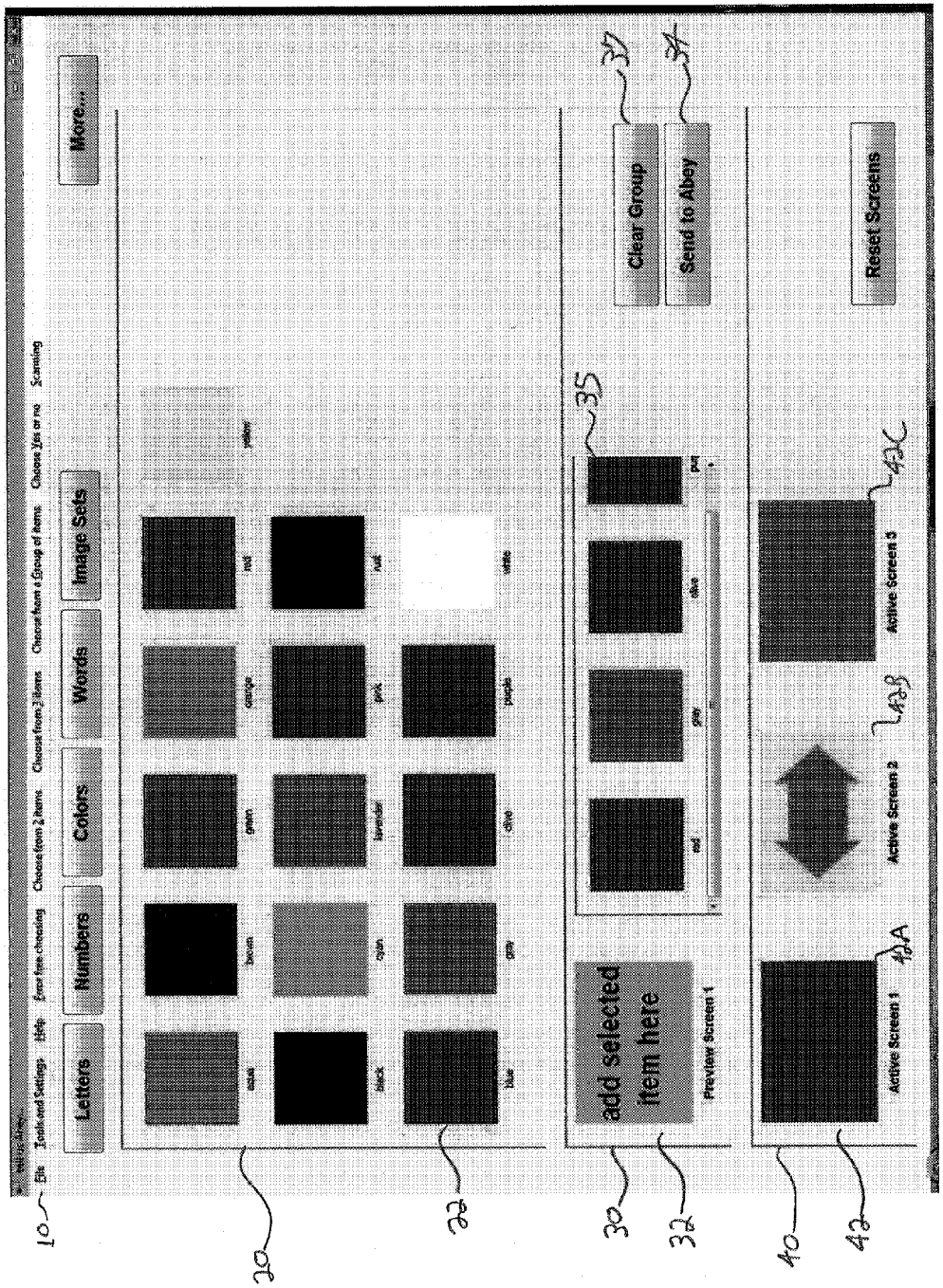

The preferred embodiment of the primary component has six operational modes: "error free choosing", "choose from 2", "choose from 3", "choose from a group", "choose yes or no", and "scanning". FIGS. 2-7 show representative screen shots of the operator's interface in each mode of operation of the primary component. Each screen provides a pull-down menu 10 or similar functionality for the operator to select from these operational modes and/or from various system settings. As mentioned previously, the images of the primary component are organized by categories, which are accessible by the operator via category buttons 12. Upon selecting a category by clicking or pressing a category button 12 (e.g., the "clothing" button as shown in FIG. 2), image field 20 is populated with a number of images 22 belonging to the selected category. The operator selects one or more images 22 from image field 20 and drags them to preview field 30, in which three preview screens 32 are disposed. Preview screens 32 directly correspond to the three screens (or three sections of one screen) that the user views, and they give the operator an idea of what the user will be looking at once the selected image(s) are sent to the user via clicking/selecting send button 34. Additional functionality buttons 36 are also provided, and they will vary according to the mode of operation being employed. Once the operator sends the image(s) to the user, the image(s) appear both on the user's screen(s) and in active screens 42 of active screen field 40 on the operator's display. That way, the operator can see exactly what the user is seeing at any given moment and can confirm that the correct images were sent to the correct locations. In the screenshot of FIG. 2, no image 22 has yet been selected, and the active screens 42 of active screen field 40 are displaying the default image of the system.

One of the image categories available is named "image sets." Accessing this category brings up a collection of images that represent each image set available. When one of these images is selected, the image selection field 20 is repopulated with a collection of related images that the operator can send to the user. For example, selecting the "Spiderman" image set calls up a collection of Spiderman images. This image category is also used to group together all the pages of a single book.

Typically the user learns to use the system via the "error free choosing" mode. The operator selects an image 22 from image field 20 and drags or otherwise moves it to the sole preview screen 32 shown in FIG. 2 that is not black, i.e., the preview screen 32 that reads "add selected item here." The operator preferably sends a single familiar image, such as a family member or a favorite food or toy to the user interface by activating send button 34. The operator asks (e.g., verbally) the user a question, such as "Where is mommy?" The user sees one image along with two black screens. The program disables the two switches under the black screens. Eventually the user pushes the switch under the screen with the image. The device rewards this selection by highlighting the image with a colored frame and/or playing a sound or generating other similar confirmatory sensory feedback, such as a vibration (e.g., haptic feedback), a light (either on the button/switch itself or remote therefrom), or the like. The color of the frame preferably matches the color of the pressed switch. The operator can then repeat this process. By using the functionality buttons 36 of FIG. 2, the operator can set the program to send the image to a certain one of the three screens (e.g., the left screen), or the program can pick a screen at random. The buttons "random 2 screen" and "random 3 screen" varies that random screen selection either between two screens (e.g., the two outer screens) or among all three screens. The user learns to associate the switch with the image on the screen above the button. Once this skill is mastered, the door has been opened for a non verbal child or adult to answer a question easily or indicate a preference.

"Choose from 2" (see FIG. 3) and "choose from 3" (see FIG. 4) modes give the user the ability to communicate a preference or answer a question from two or three possible images. "Choose yes or no" (see FIG. 7) gives the user the ability to quickly answer a yes or no question by selecting the switches under yes and no images. For example, as shown in FIG. 7, active screen 42A and active screen 42C are provided with "yes" and "no" selections, while center active screen 42B is provided with an image. The operator can ask the user a question, such as "is that a foot?" The user can select the button under either the left or right screen to indicate the correct answer to the question. In the example of FIG. 7, the user is supposed to select the rightmost button under "no", since the image displayed in the center screen is that of a hand.

"Choose from a group" mode (see FIG. 5) enables the operator to assemble a collection of images in excess of the number of user screens. In this mode, one preview screen 32 is shown in preview field 30, along with the entire collection of selected images in section 35. If the operator wants to wipe out the selected images, the clear group button 37 is activated. Two of these selected images are displayed to the user at any given time on the left and right screens as shown in active screens 42A and 42C. The user can cycle through the collected images by pushing the switch under the center screen 42B. When the desired image is displayed in either the left or right position, the user can select that image. This makes more complex communication possible. This also begins training for scanning.

Figure 6:
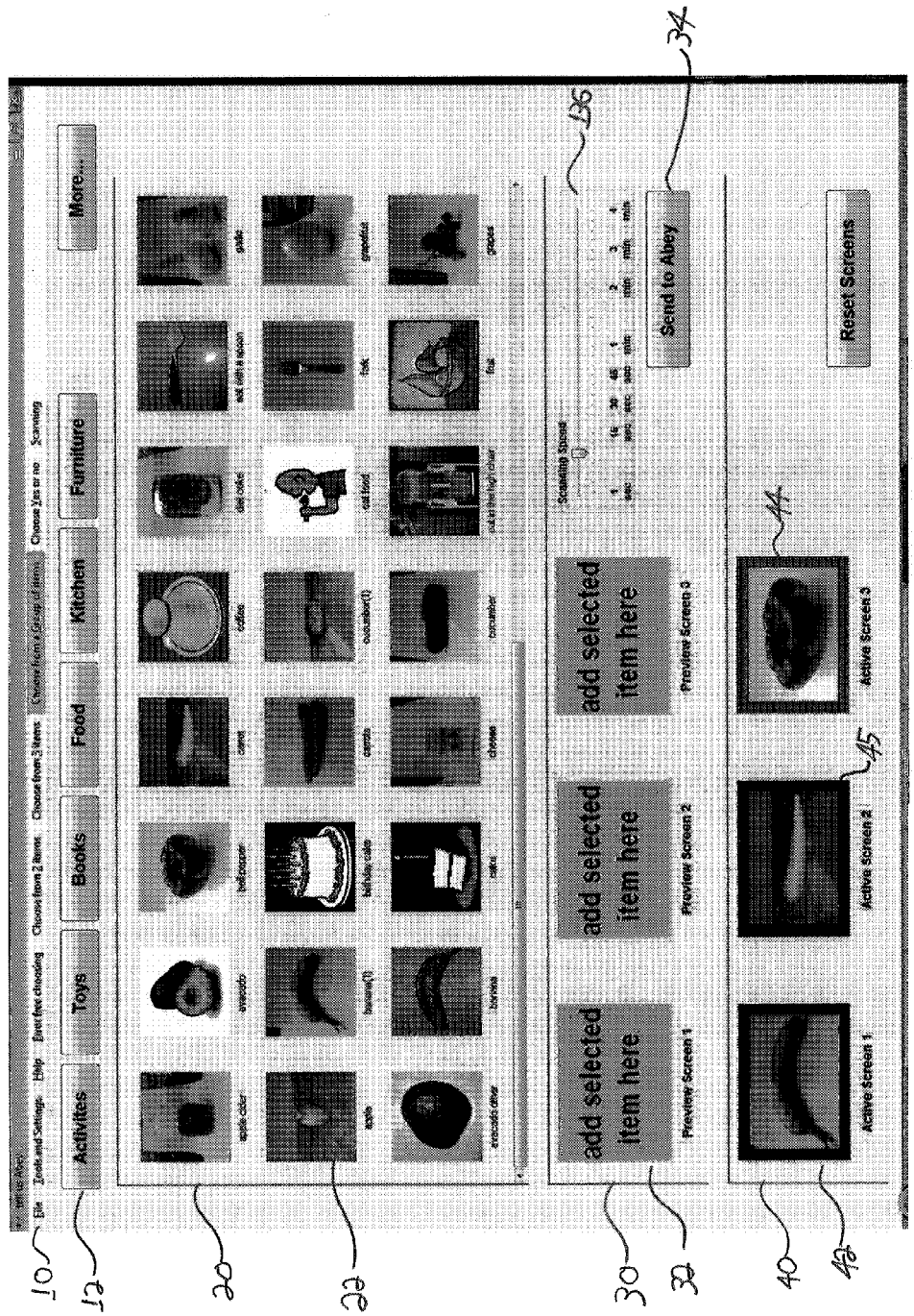

In "scanning" mode (see FIG. 6), the operator selects one, two, or three images and sends them to the user as described above. In scanning mode, however, each of the images is surrounded by a border or frame on the user's screens. A highlighting colored 44 frame advances from image to image, and a dark or black frame 45 remains around the other two unhighlighted images. The program can be set in two ways. In "prescanning", as shown in FIG. 6, the user must select the switch under the highlighted image. Otherwise a "try again" message is displayed. In "scanning" the user makes a choice by pressing any switch. The image is highlighted when the switch is pressed is selected. There is also a "group scanning" mode in which the operator assembles a collection of images that advance across the three screens. This allows for scanning with more than three images. In this mode, the middle screen is always highlighted. The user presses the switch in the same manner as "prescanning" and "scanning." The image in the center screen is selected. These different methods of scanning accommodate users with varying motor planning abilities. These scanning methods also help train users in the use of other communication devices that use scanning. The time that the highlight frame dwells on an image before advancing to the next image can be adjusted by the operator by use of slide selector 136, e.g., from one second to two minutes.

In any or all of the above operational modes, the beginning user will most likely start with full size images that fill up an entire monitor 212. Over time, the program can be set to gradually reduce the image size and move the images closer together. This is schematically represented in FIGS. 8A-C, which depict the user screens having successively smaller images displayed thereon. In FIG. 8A, the three images are full sized and fill up substantially the entire screen of each monitor. In FIG. 8B, the size of each image is reduced, the image on the left monitor is shifted somewhat to the right of center of that monitor, and the image on the right monitor is shifted somewhat to the left of center of that monitor, with the center image being made smaller but remaining substantially in the center of the central monitor. In FIG. 8C, the size of each image is reduced and center-biased more so than in FIG. 8B. This training helps a user to transition to a portable version of the system that runs on a single screen. As an alternative, instead of moving the smaller images towards the center, the smaller images could be pushed out towards the outer sides of the monitors (i.e., the left image is shifted towards the left side of the left monitor, and the right image is shifted towards the right side of the right monitor), in order to work on the user's peripheral vision skills. Other variations in this vein are contemplated.

Figure 9:
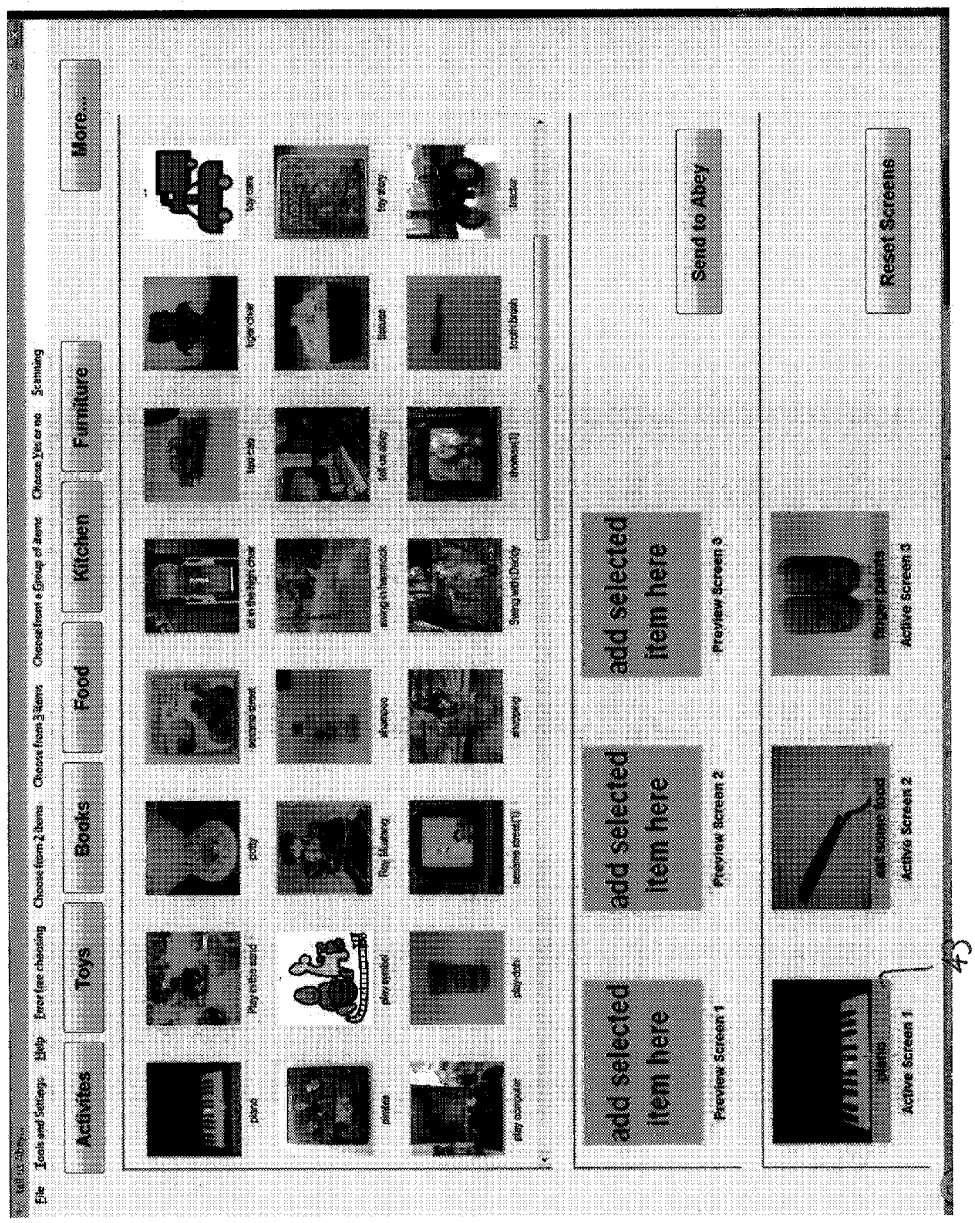

As shown in FIG. 9, the inventive primary component can be set to display a large text title 43 below the images. This furthers the users training in reading and writing. It also helps the user transition to the text based versions of the system (to be described below).

Figure 10:
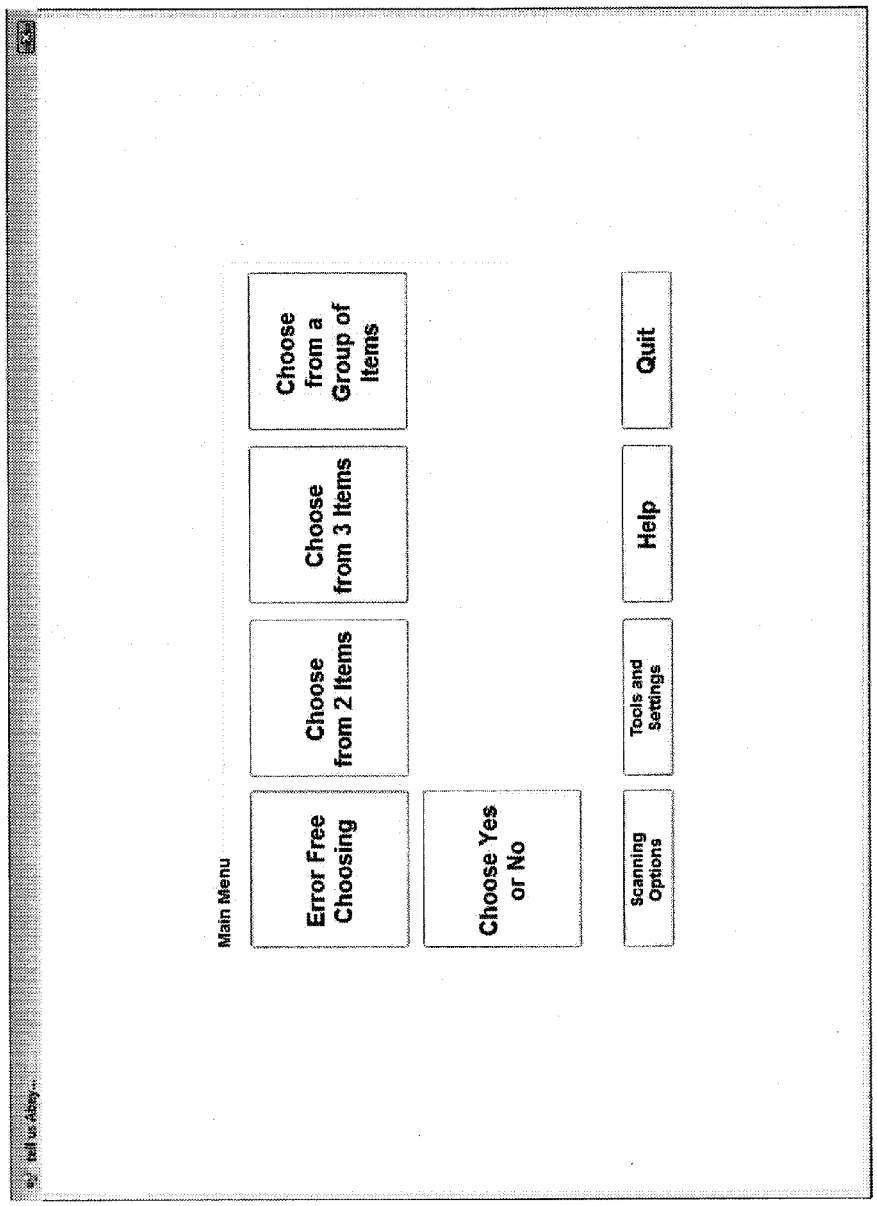
FIGS. 10-12 are representative exemplary screen shots of an alternate embodiment of a single screen image-based assistive communication device in accordance with the primary component of the invention.
Figure 11:
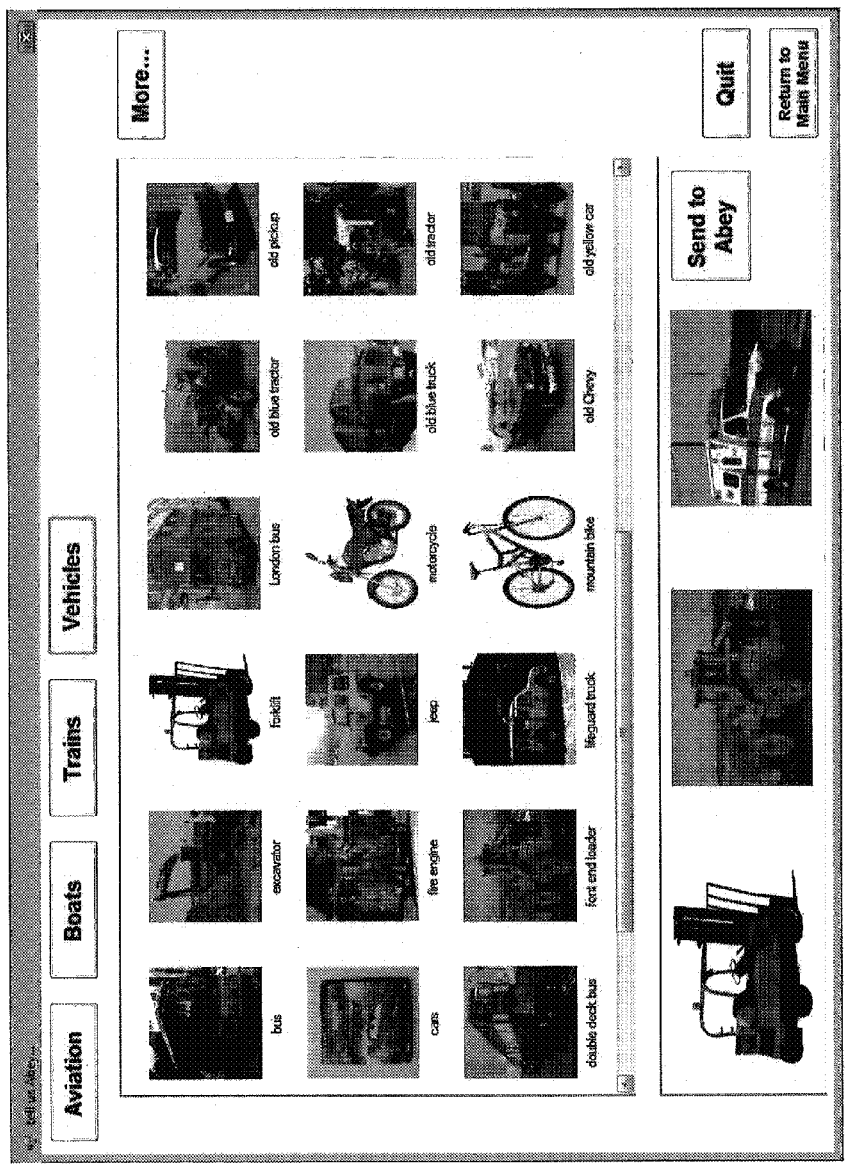
Figure 12:
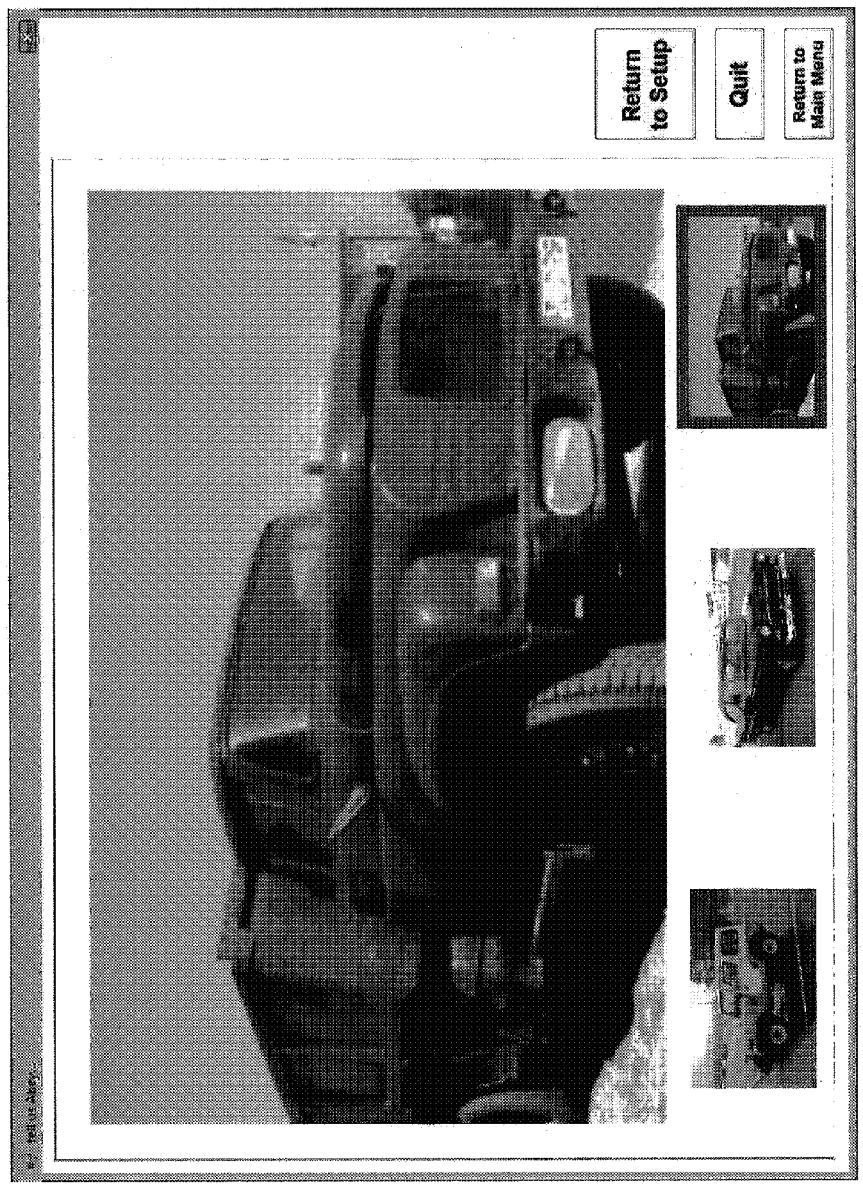

All of FIGS. 2-9 depict operation of the primary component in its three screen embodiment. FIGS. 10-12 depict various aspects of the alternate single screen embodiment. For example, FIG. 10 depicts the main menu of the operator interface of the single screen embodiment. FIG. 11 depicts the "choose from 3" mode as it appears on the operator interface. Three images have been selected to be sent to the user. FIG. 12 depicts the "choose from 3" mode as it appears on the user interface. Three images have been sent to the user, and the third image is being highlighted.

Up until now, the primary image-based component has been described. Hereinbelow the discussion centers around the secondary text-based component for more advanced users. Reference is also made to FIGS. 13-26, all drawn to the secondary component.

The secondary component builds on the same user interface approach employed in the primary component. The user pushes a switch under a computer monitor to select the item displayed above; confirmatory sensory feedback is preferably provided to the user. However, in the secondary component, this approach has been adapted for text-based communication. The system provides quick switch access to the letters, numbers, and other items on a standard alphanumeric keyboard, and musical notation. This makes it possible for disabled users to communicate in their own "voice." The user is not choosing from a set of pre-written words or phrases, and there is no operator interface at all; the user is completely autonomous. The program is completely driven by the user with the exception of its initial launch. The content produced by the user is displayed on the main screen and can be printed, saved to a text file, or appended to an existing file.

Figure 13:
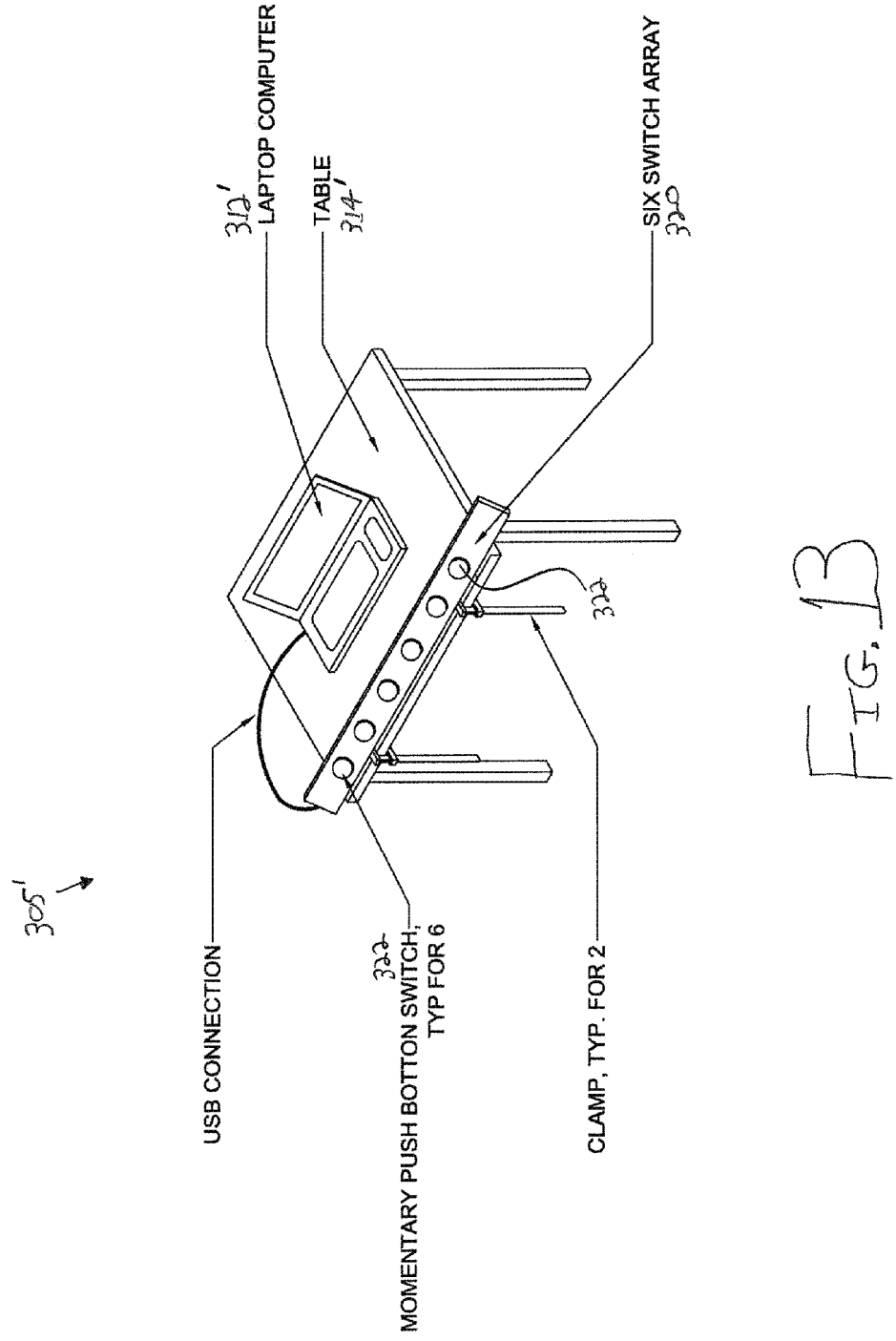
FIG. 13 is a perspective drawing of a portable embodiment of an exemplary text-based assistive communication device in accordance with the secondary component of the invention.
Figure 26:
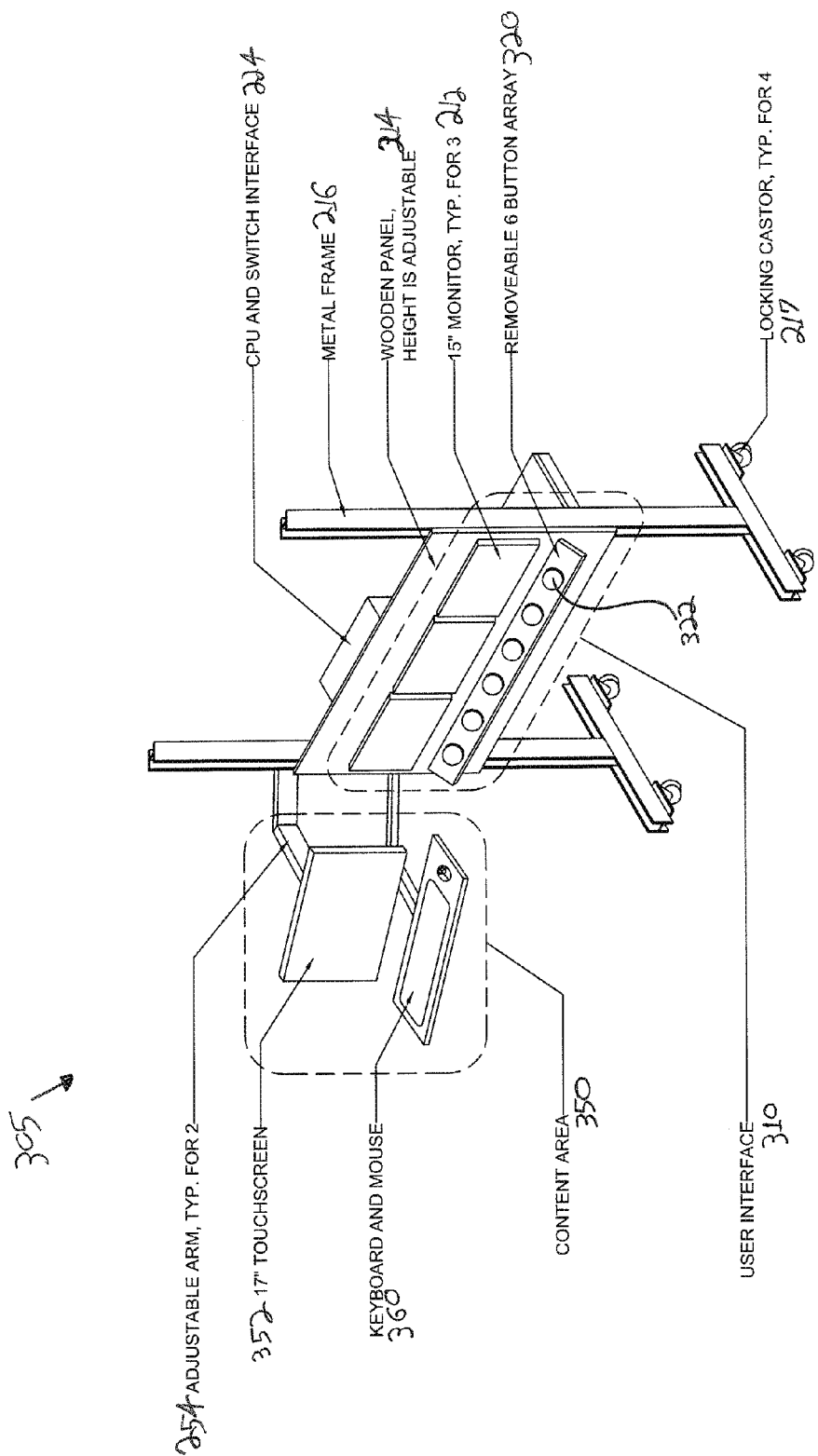
FIG. 26 is a perspective drawing of a full-size embodiment of an exemplary text-based assistive communication device in accordance with the secondary component of the invention.

As shown in FIGS. 13 and 26, the secondary component 305 (or 305') has preferably six momentary push button switches 322 on the main array 320. This change from the three switches 222 used in the primary component and allows the selection of a letter of the alphabet in two switch presses (discussed below). The user can also access the screen button controls via a mouse or a touchscreen. This method produces the same result as pressing a switch. This allows use of the program without the switch array.

The six switch array is preferably a USB device that can be patched into almost any computer running the inventive software. The preferred embodiment of the array is 44" long by 5" wide. Mounted to the array are six small (approximately 2") momentary push button switches, evenly spaced. When a switch is activated, an audible click or other confirmatory sensory feedback is produced to signal the user that the switch hit has been successful. Each switch is preferably a different color that corresponds to the software. The array has two universal clamps that make it possible to mount the array to almost any table. In its mounted position, the array rests at an angle, preferably a 45° angle, to the table top. This array, coupled with computers and displays of different sizes, forms the various embodiments of the secondary component.

The full size version of the secondary component 305 is very similar to the full size version of the primary component, and it is shown in FIG. 26. The six switch array replaces the thee switch array of FIG. 1. There is no operator interface in the secondary component, but there is a touchscreen 352 or other monitor attached to one side of the unit—that is where the content is displayed. That screen is a duplicate of the smaller single screen embodiment of FIG. 13 with a content window on the top and the six buttons on the bottom of the screen, to be described below. Those button images are recreated on the three screens 212 above the switch array with two large buttons per screen. These buttons have the same proportions as the ones depicted in the screen captures of FIGS. 14-25 and are the same in every way—except bigger. The user interface display includes three 15" computer monitors mounted to a panel 214 (e.g., a wood panel) that is mounted to a frame 216 (e.g., a metal frame). The height of the monitor holder 214 is adjustable to accommodate the user. The switches of the six-button array are lined up under the 15" monitors, preferably with two switches per monitor. The entire frame preferably includes locking swivel castors 217 so it can be easily moved. The central processing unit is preferably mounted to a shelf that is attached to the frame behind the three monitors.

A portable version 305' is depicted in FIG. 13 and includes a laptop or netbook computer 312'. The computer rests on a table 314' at an appropriate height for the user. The six switch array 320 is clamped to the table 314' in front of the computer.

Figure 27:
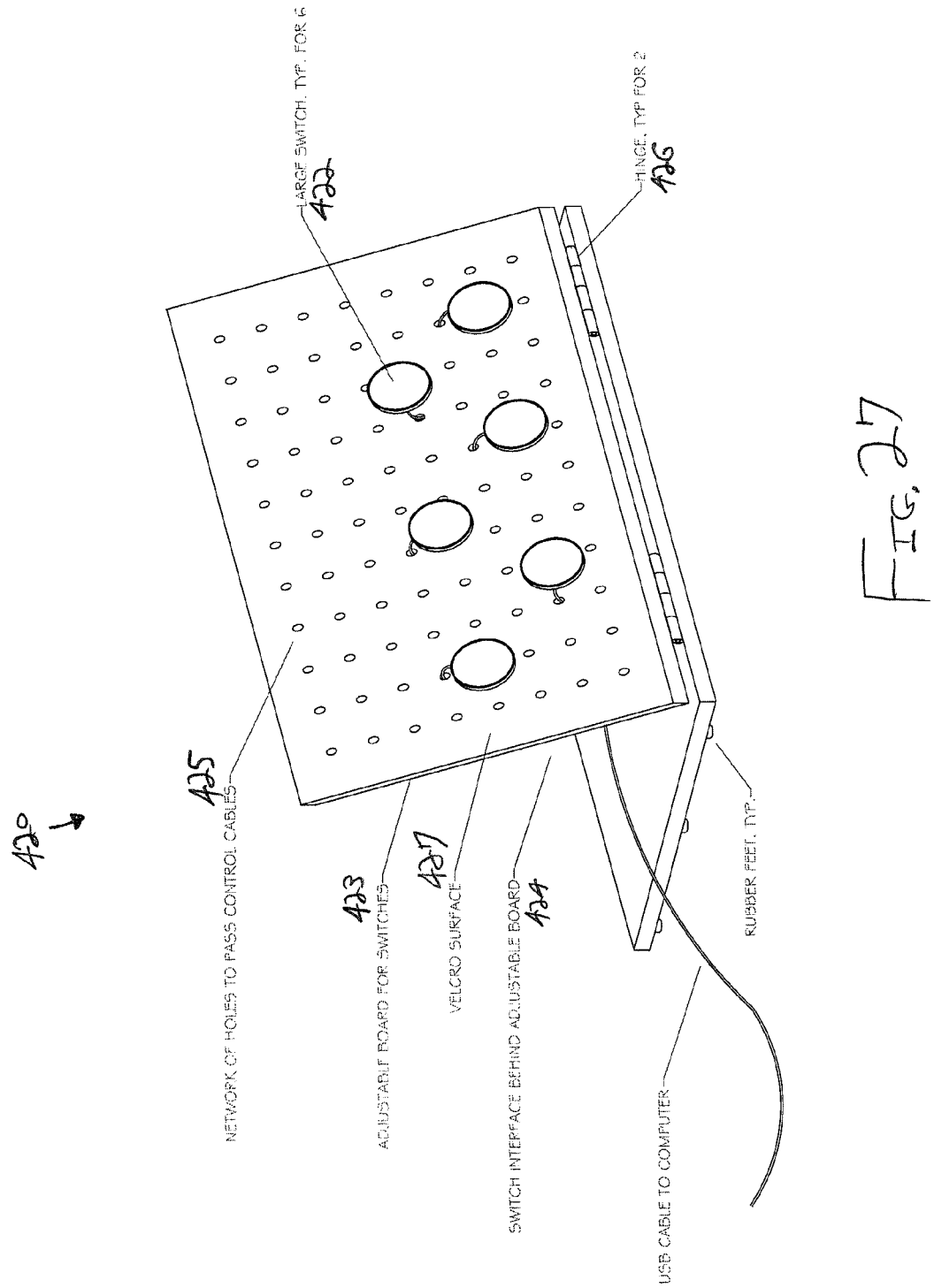
FIG. 27 is a perspective drawing of an alternate control panel in accordance with the secondary component of the invention.

An alternate switch array 420 is depicted in FIG. 27. Individuals will have different strengths and weaknesses in their respective motor skills. To with, a switch array 420 having adjustably positionable buttons/switches is contemplated. An adjustable board 423 is provided with a series of holes 425 through which wires/cables connecting switches 422 to the switch interface 424 can be passed. The front surface 427 of board 423 may be provided with an adhering mechanism (e.g., hook and loop fasteners, ferromagnetic material, with magnets provided on each switch, etc.) to help secure switches 422 to the board. Optionally, switches 422 may be provided with peg-like rear structures that snugly fit within holes 425. As another option, switches 422 may communicate wirelessly with the switch interface 424, thereby obviating the need for cables/wires. As yet another option, board 423 and holes 425 may be electrically wired like a very large "breadboard" or solderless plugboard, with switches 422 each having an electrical connector that fits within holes 425. In any event, this embodiment provides a switch array where the positions of the switches can be set to provide the best access to a specific user. After the best positions for a user were found, the switches can remain in that configuration for that user, and the user would learn those locations. The locations need not all be in a single line. Instead, they could be two rows of three switches each as shown in FIG. 27, two vertical columns of three switches each, a circle of six switches, etc.) until a desirable configuration is achieved. Someone whose motor planning is limited to using their head might use two arrays of buttons each on either side of their head, for example. Other configurations are also contemplated.

Other physical configurations are also contemplated. For example, a large single-screen display embodiment (not shown) includes central processing unit, a 24" flat panel display screen, and the six switch array. The display screen is mounted at a height so that it can be seen by the user and the switch array is mounted in front of the display.

FIGS. 14-25 represent exemplary screen shots of the secondary component. For the sake of simplicity, each of these screen shots are of the FIG. 13 single screen portable embodiment 305' and/or the side touchscreen/monitor 352 of the full-size embodiment 305 of FIG. 26. Depictions of the three monitors 212 of the full-size embodiment are not included for simplicity.

Figure 14:
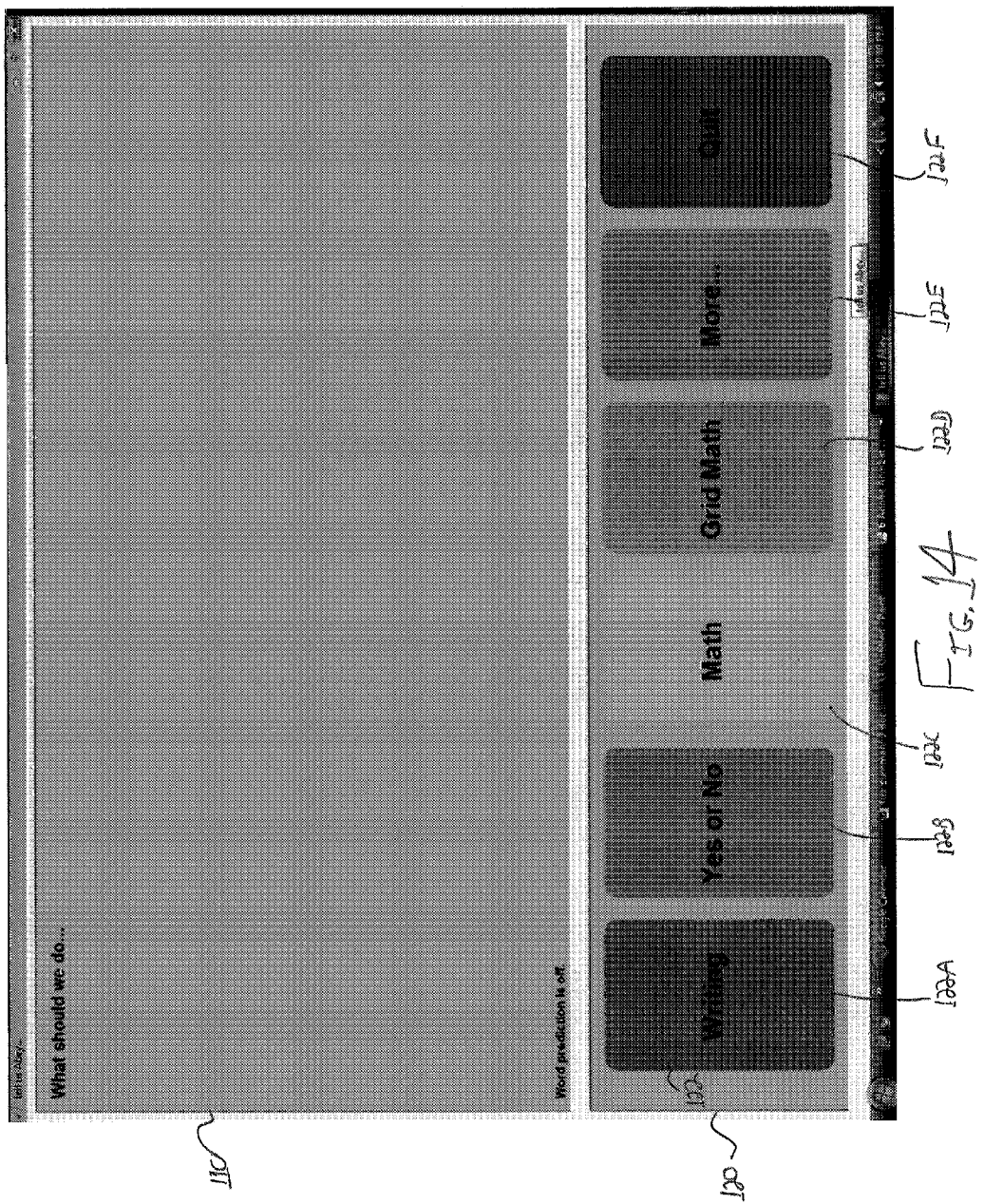
FIGS. 14-25 are representative exemplary screen shots of an exemplary text-based assistive communication device in accordance with the secondary component of the invention.

FIG. 14 is an exemplary screen shot of the main screen 100 of the secondary component, which includes a two-dimensional content area 110 (as opposed to a single line of text or numbers) and a functionality area or user interface 120. Within the functionality area 120 are six function buttons 122, each corresponding to one of the switches in the six switch array shown in FIG. 13. Preferably, for ease of use, each on-screen function button 122 is color coded to match the six switches of the array. That which appears in the user interface 120 also appears on the three monitors above the six-button array of the full-size embodiment of FIG. 26, two buttons to a monitor (e.g., buttons 122A and B appear on the leftmost monitor, buttons 122C and D appear on the center monitor, and buttons 122E and F appear on the rightmost monitor). Thus, when at the main screen, if the user wishes to activate the writing mode, he would press the left-most red switch of the array. Because the switches are of a significant size (e.g., in the preferred embodiment, approximately 2") and are spaced apart significantly (e.g., in the preferred embodiment, approximately 4" apart, up to 44" all together), users with poor fine motor control but who do possess good gross motor control can easily work with the secondary component. In addition or in the alternative, for those users who have better fine motor control, the on-screen buttons 122A-F may be touch screen buttons (either on the three monitors of FIG. 26, or the side monitor of FIG. 26, or the computer screen of the FIG. 13 embodiment, or the like) and serve the same purposes as the array switches 322. Thus, for the purposes of clarity, although the description hereinbelow mentions the pressing of "buttons 122A-F" for brevity, the invention contemplates that term meaning the pressing of either the actual on-screen buttons 122A-F or the switches 322 in the array 320 corresponding to buttons 122A-F.

The actual functions corresponding to the buttons 122/switches change from screen to screen, as will be described below. As shown in FIG. 14, button 122A activates the writing mode, button 122B activates the yes or no mode, button 122C activates the math mode, button 122D activates the grid math mode, button 122E enables additional choices for the user, and button 122F allows the user to quit and exit the program. These modes are merely exemplary and need not all be present or be present in the specific order or location depicted in the figures. Additional modes are contemplated and not excluded from what constitutes the invention. Description of each of the modes listed above follows.

Figure 15:
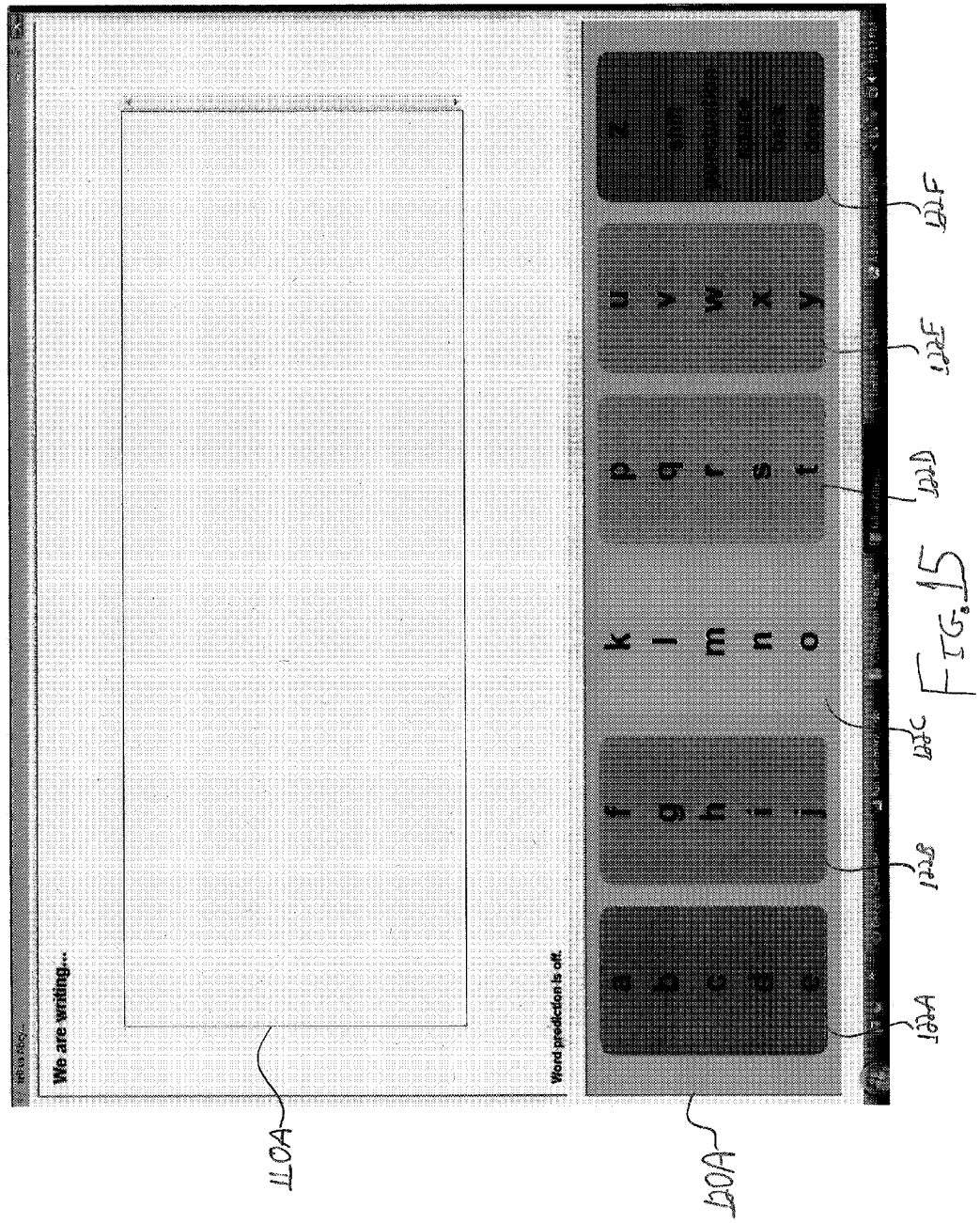

FIGS. 15-20 depict various screen shots of the secondary component in the writing mode, i.e., after the user has pressed button 122A from the main menu as shown in FIG. 14. As shown in FIG. 15, the writing mode has a content area 110A containing a text box and a user interface area 120A with six screen button 122A-F that correlate to the six color-coded switches on the array below. Button 122A represents letters a through e, button 122B represents letters f though J, and so on. Button 122F offers the user the choice of letter z plus other functions, such as shift, punctuation, space, back, and exit/done. By selecting a combination of two switches in the user interface area 120A, any letter of the alphabet can be typed. Each typed letter appears in the text box in the content area 110A. After displaying the newly typed letter the user interface reverts to the original writing layout.

Figure 16:
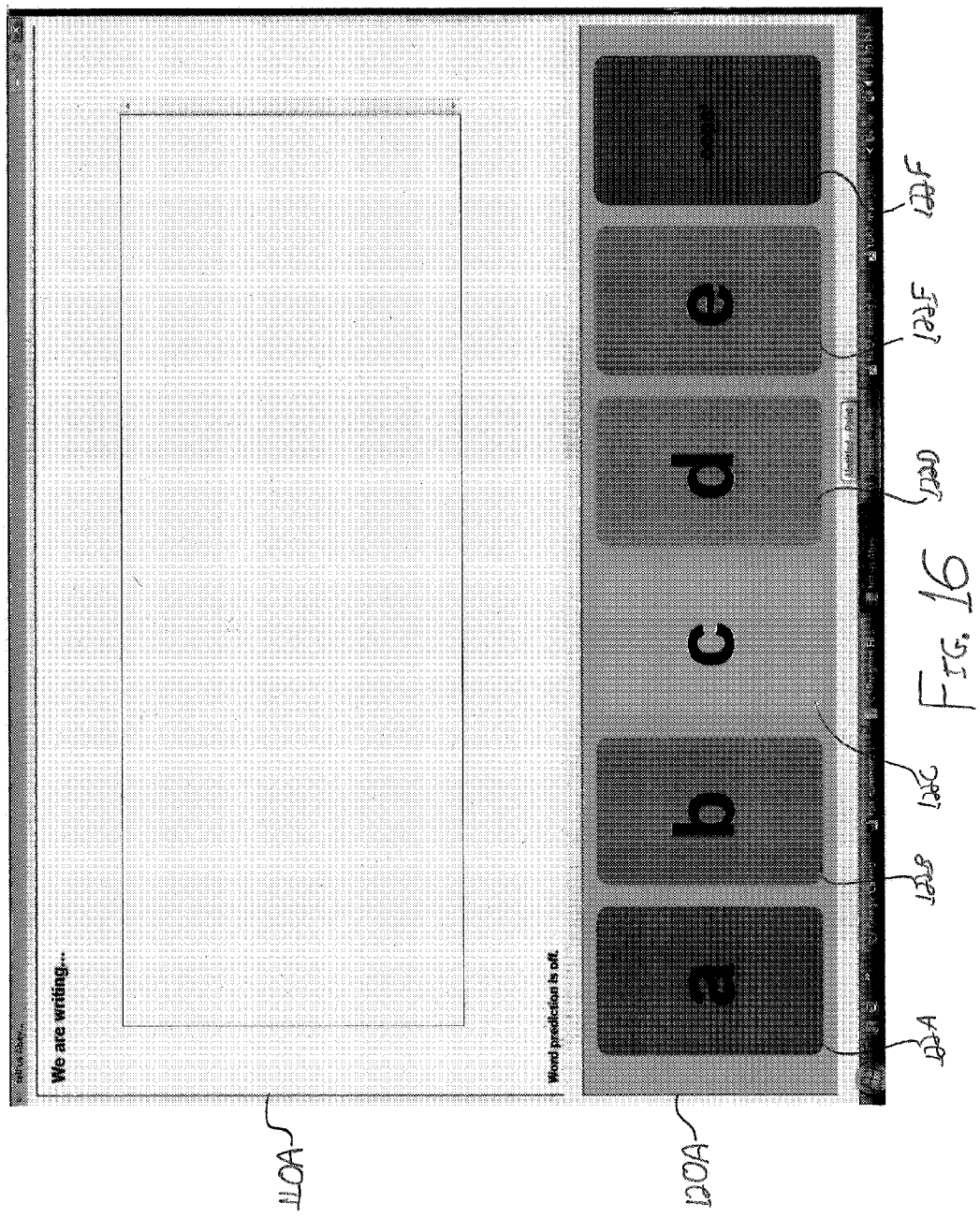
Figure 17:
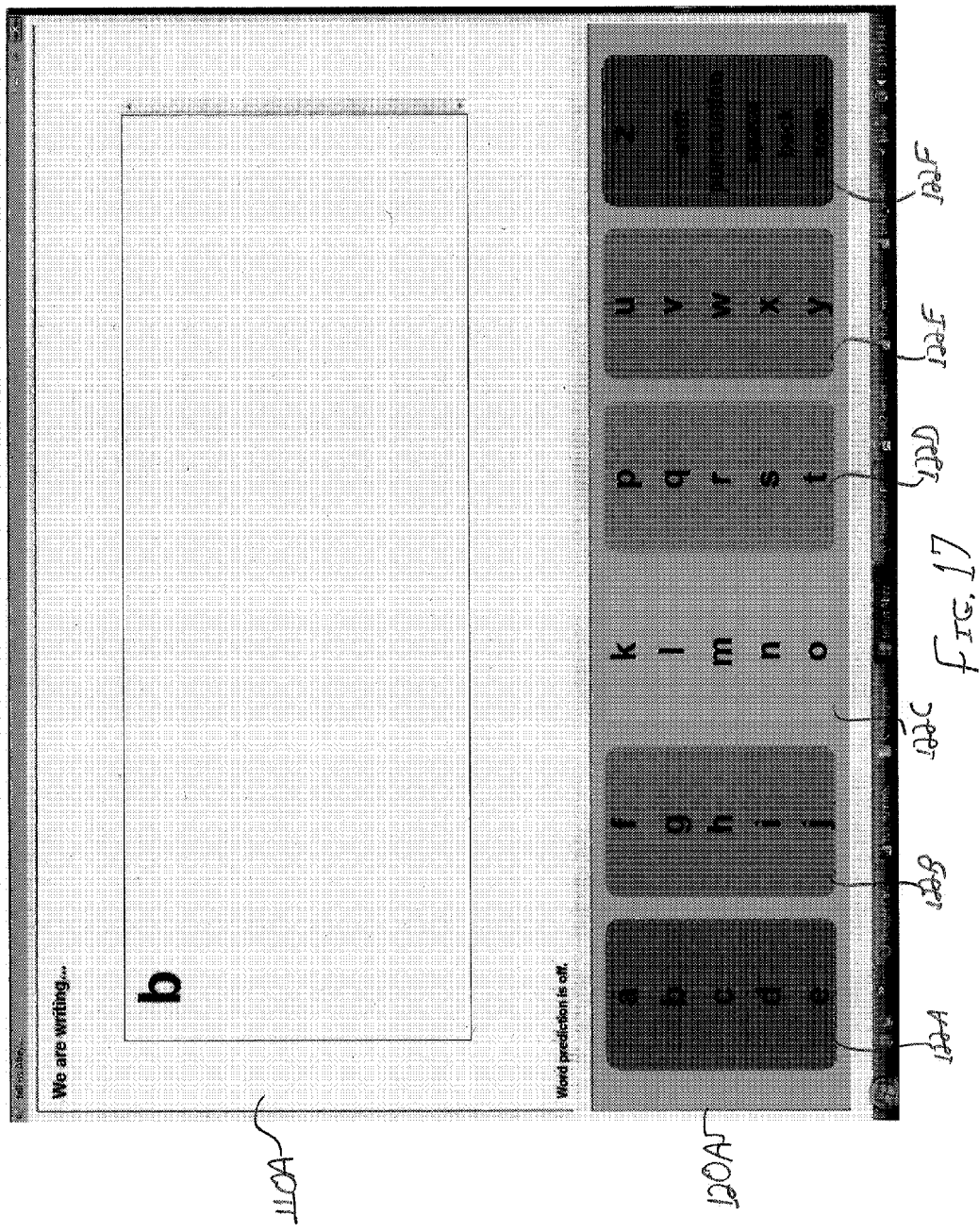

With additional switch combinations the user can capitalize, insert spaces or punctuation, and start a new paragraph. When the writing mode is closed, all that has been written is preferably saved to a text log file with a time and date stamp for each entry. This prevents an inadvertent loss of work due to accidental button misses or hits and provides a record of the user's progress For example, the user begins at level 1 of the writing mode as shown in FIG. 15. If the user activates button 122A, the user interface 120A changes what each of buttons 122A-F represents, as shown in FIG. 16. Specifically, previously, as shown in FIG. 15, button 122A represented letters a-e. Now, as shown in FIG. 16, each of those letters is assigned to its own button, i.e., button 122A now represents the letter a, button 122B now represents the letter b, etc. Button 122F is labeled "oops" to allow the user to go back if these letters are not what was intended to be selected; pressing button 122F in this contexts reverts the writing mode to level 1 as shown in FIG. 15. In any event, when the user selects a button in level 2 as shown in FIG. 16, that letter appears in the text box of content area 110A, and the writing mode reverts to level 1. As shown in FIG. 17, the user has selected button 122B of FIG. 16, so a letter b appears now in the content area 110A of FIG. 17; user interface 120A has reverted to writing mode level 1. In this configuration, the user can access any letter of the alphabet in two button presses (in this case, button 122A, then button 122B to type the letter b).

Figure 18:
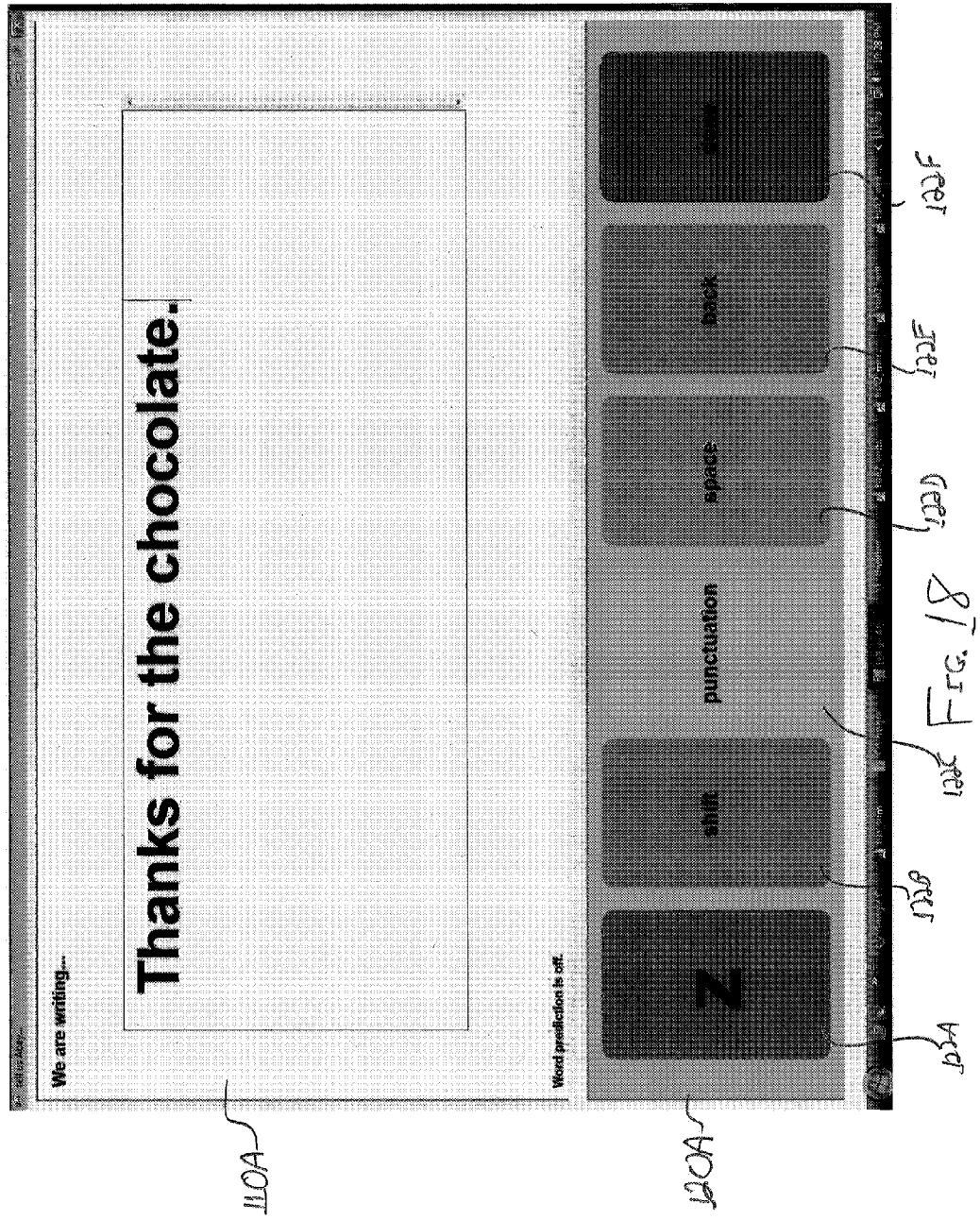
Figure 19:
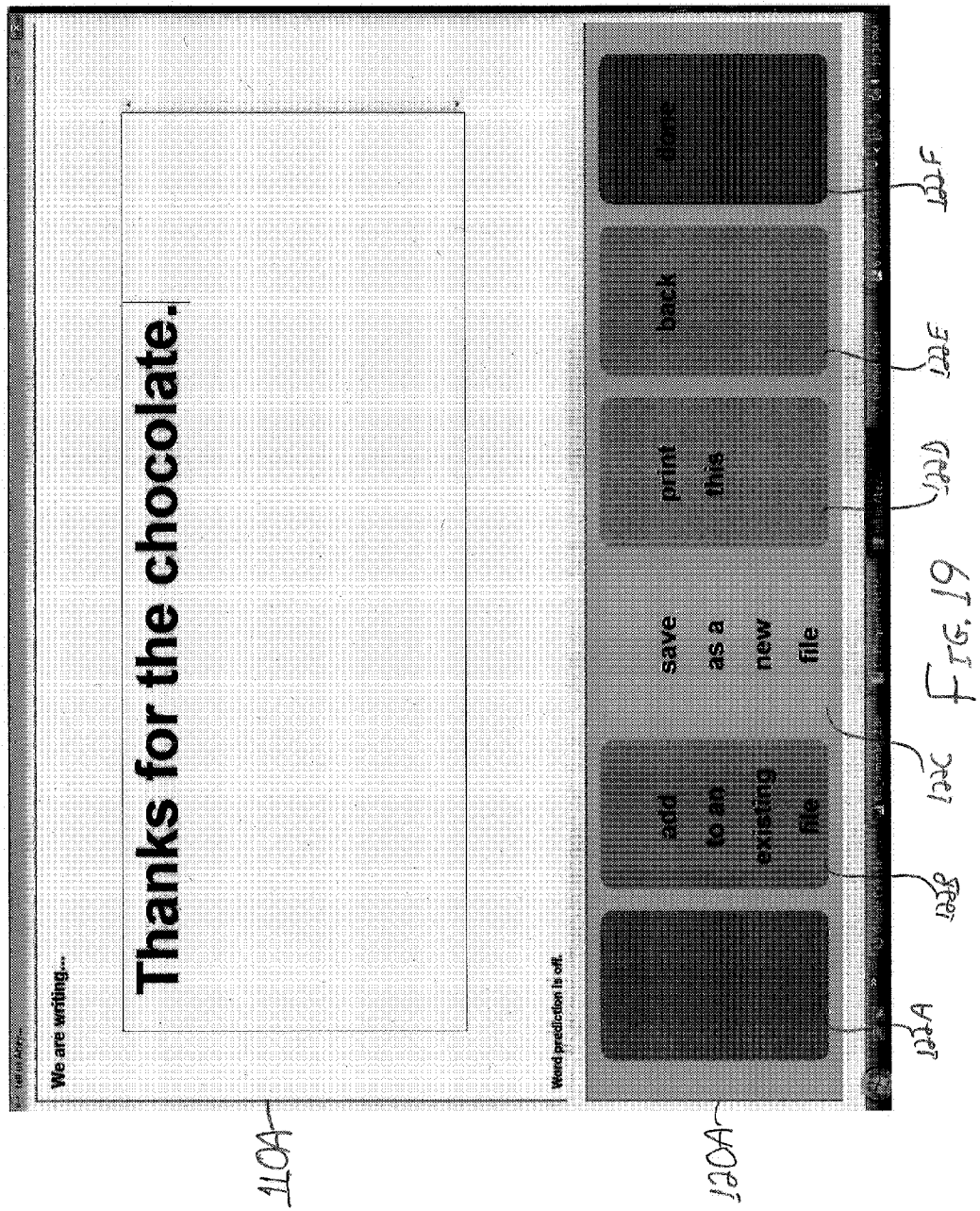

At some point, the user will be finished with generating text. In FIG. 18, content area 110A is showing a completed sentence, and the user has just selected button 122F from level 1, which had represented z, shift, punctuation, space, back, and done. The user now presses button 122F again to select "done", and the user interface choices switch to what is shown in FIG. 19. Choices for the user include adding the text to an existing file (button 122B), saving the text as a new file (button 122C), printing (button 122D), going back to the previous level (button 122E), and done (button 122F). Other options may be included in addition or in the alternative, such as uploading the text to a website, e-mailing the text, a social networking function such as "chat", or the like. FIG. 28 depicts an overview schematic of the secondary component in which the user interface 310 can save content to and retrieve content from the CPU 224 and its memory or other storage medium. Other options include sending the content to a printer 360 for printing onto paper and/or labels or stickers 400, to be discussed below. The content may be uploaded from the CPU 224 to the internet (or any other external computer) 500 via a conventional computer communications link (e.g., WiFi, cable modem, etc.). Similarly, content may be downloaded from the internet (or any other external computer) 500 to the two-dimensional content area for editing and/or saving by the user.

Figure 20:
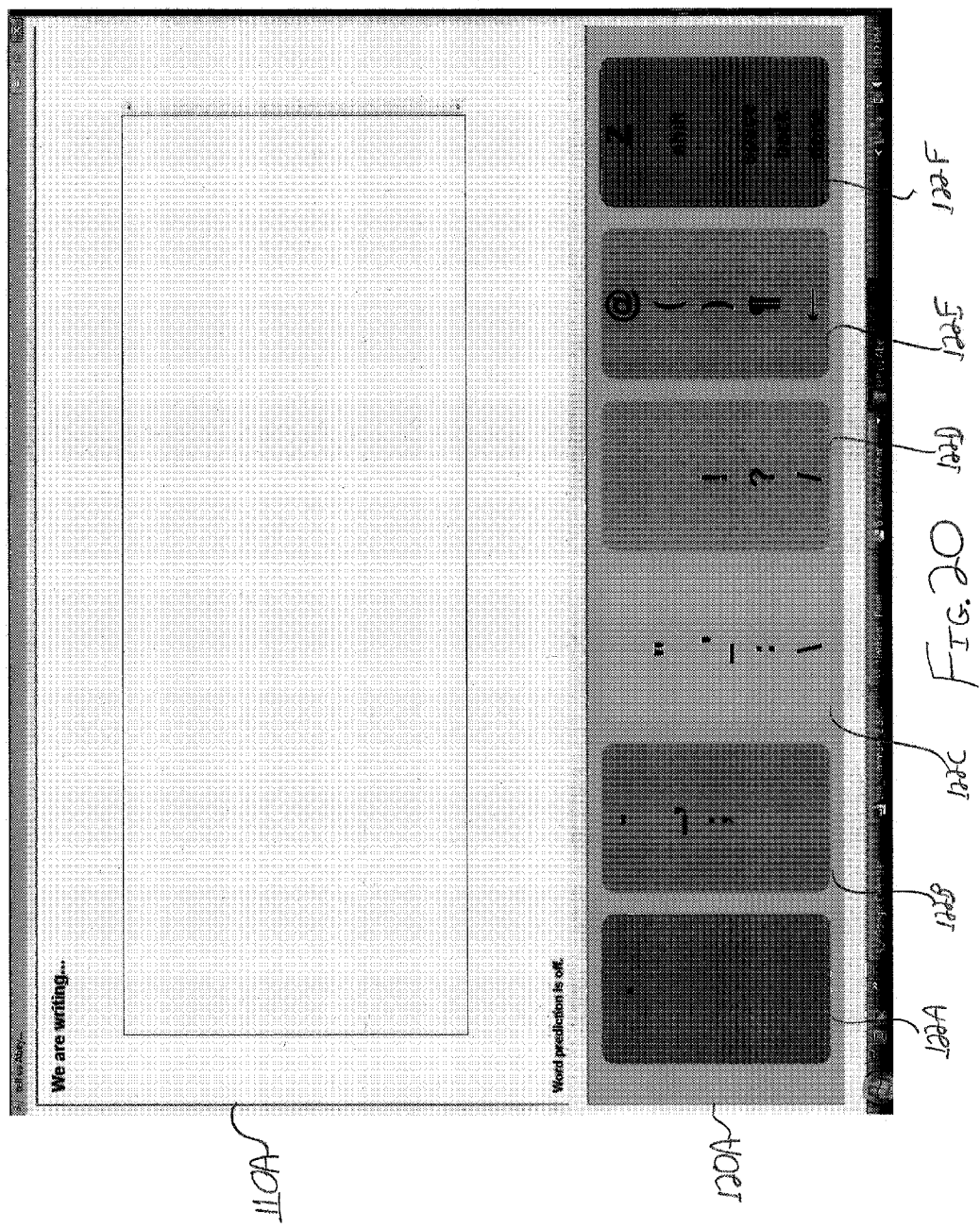

FIG. 20 depicts the punctuation options available to the user. Here, the user has already pressed button 122F from writing mode level 1 (FIG. 15) and then pressed button 122C from writing mode level 2 (FIG. 18). A variety of commonly used punctuation marks and related symbols are provided, selectable as above. For example, if the user now wishes to print a colon, he would press button 122C, which would bring up writing mode level 3 (not shown) in which the quotation mark, comma, dash, colon and back-slash are each assigned to one of buttons 122A-E, and then the user would press button 122D corresponding to the colon. Other characters may be employed, and indeed, the entire writing module may be configured for multiple languages.

Figure 21:
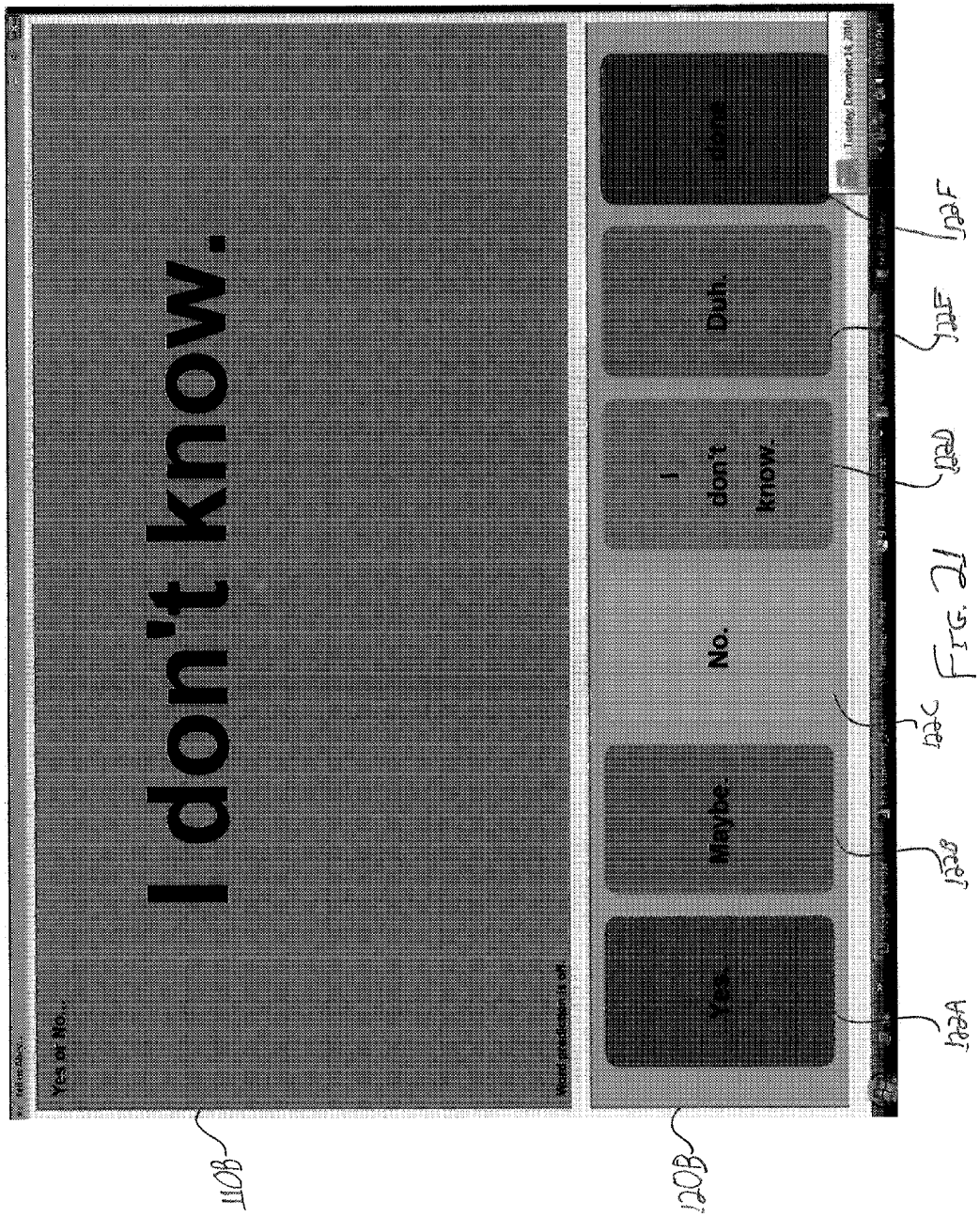

Another mode of the secondary component is the yes/no mode. In yes/no mode, the user can answer simple questions with a variety of short pre-programmed answers, such as "yes", "maybe", "no", "I don't know" and "duh". Other pre-programmed responses can be used in addition or instead of these. This mode facilitates quick communication, and it also provides an entrée to a new user who is too mature for pictures but not yet familiar with the writing mode. FIG. 21 depicts a screen shot of the secondary component in its yes/no mode. Content area 110B shows what mode the device is in as well as the selected answer. In this case, the user has selected button 122D from user interface 120B, and the answer "I don't know" appears in the content area.

Figure 22:
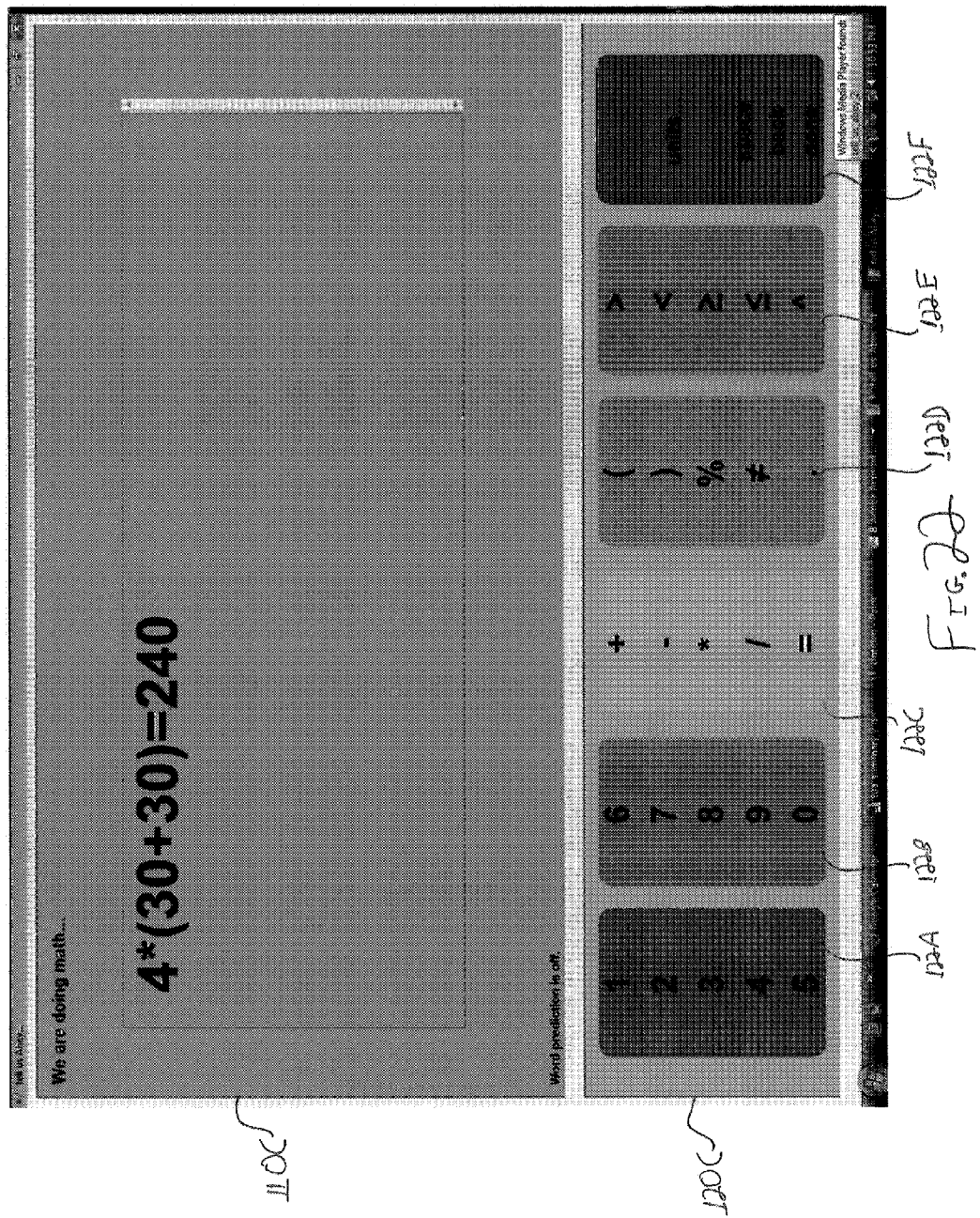
Figure 23:
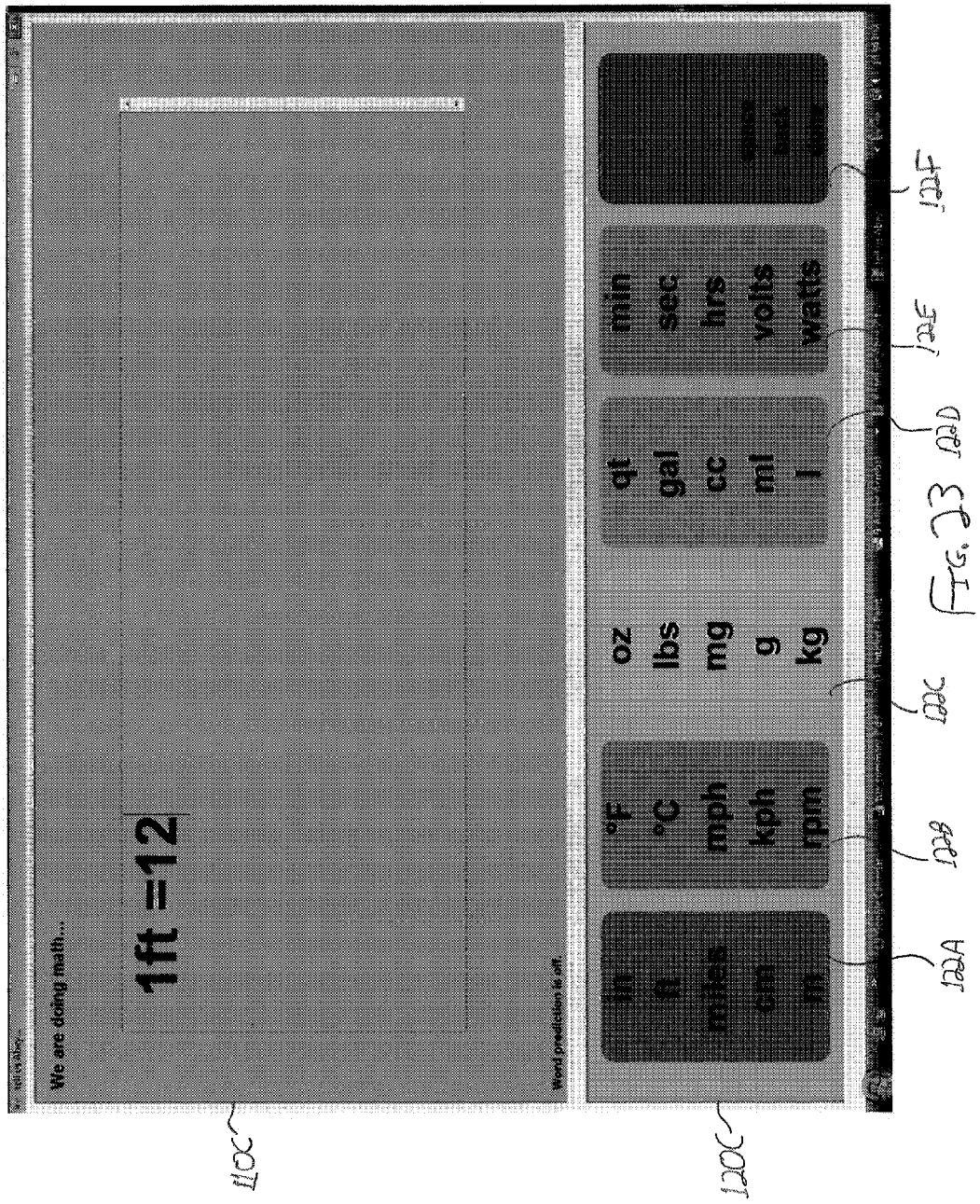

The math mode is similar to the writing mode, with numbers and symbols instead of letters. Functions, the decimal point, as well as 25 different units such as inches, miles per hour, etc. are also available. The output, like text writing, is horizontal. It too can be printed or saved and is also logged in a text file with a time and date stamp. FIGS. 22 and 23 are demonstrative screen shots of the secondary component in different phases of the math mode. FIG. 22 is the level 1 math mode screen, in which an equation is being typed and appears in content area 110C. User interface 120C includes the same color coded function buttons 122A-F as before, only this time numbers and symbols are assigned to the buttons instead of letters and punctuation. The user interface 120C of FIG. 23 is at the units level 1 (or math mode level 2, since the user selected button 122F from the screen shown in FIG. 22). In the example of FIG. 23, the user should press button 122A once to spread the choices of in, ft, miles, cm, and m across buttons 122A-E (with button 122F serving as a "back" or "oops" button), and then press button 122A again to select in as the proper units. Space, back, and done functions are assigned to button 122F as shown in FIG. 23. The units and functions shown are merely representative; other units and functions may be employed in addition or in the alternative.

In addition to writing and performing linear or horizontal math, the typical student or worker is often called upon to perform vertical math, in order to break the problem down into discrete workable portions. A typical person can write linearly that 1+2=3 without "figuring it out", however most people could not simply rattle off the answer to 63*27 from the tops of their heads. Most people would need to line up the numbers vertically and perform more basic arithmetic, such as "7*3 is 21, write the 1, carry the 2; 7*6 is 42 plus that carried 2 is 44, write 44 . . . ."

The secondary component of the invention includes a mode that accomplishes just this type of vertical math, and it is referred to as the grid math mode. In the grid math mode, as shown, e.g., in FIGS. 24-25, an array or grid of empty boxes 112 appears in lieu of the text box in the content area 110D. This allows the user to do math vertically, which is required after first grade in a typical curriculum.

Figure 24:
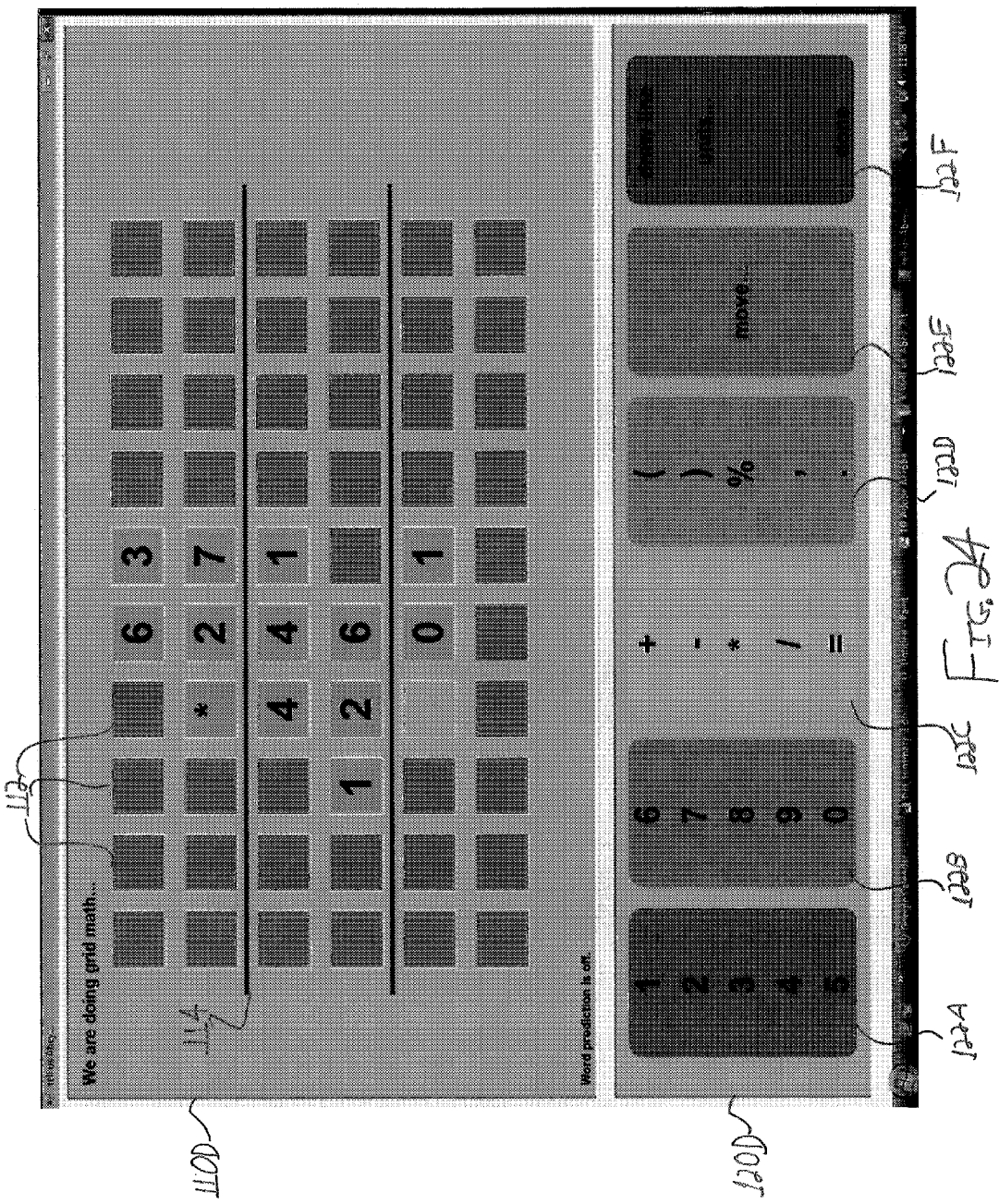
Figure 25:
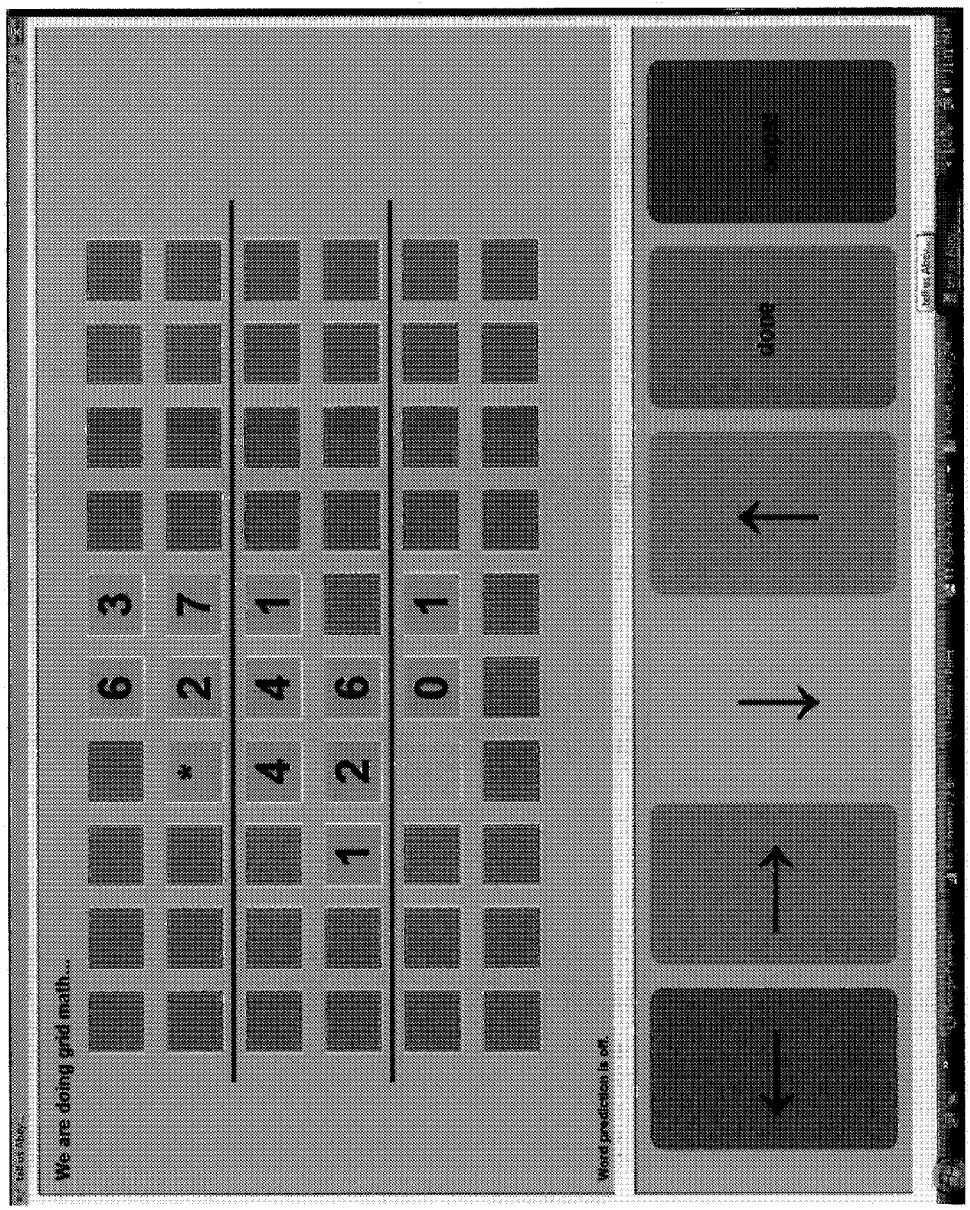

As shown in FIG. 24, the user has the numbers, functions, etc. assigned to buttons 122A-D in user interface 120D, just as the letters and punctuation are assigned to the same buttons in the writing mode. In addition, a "move" function is assigned to button 122E. The "move" button 122E brings the user to the screen shown in FIG. 25, in which a set of four arrows, assigned to buttons 122A-D, allow the user to move around the grid. When the user is typing the problem to be solved, the program automatically shifts focus to the next box 112 on the right in the same row of boxes. That is, the cursor or highlighted box 112 passes from left to right in the same manner as a typical student would write down such a problem on paper. After the problem is set up, the user selects "draw line" by pressing 122F (from FIG. 24) and then the "draw line" button on the next level of the mode (not shown). The program adds a line 114 as one would in conventional vertical arithmetic. After drawing line 114, as each grid box is filled with the answer by the user below line 114, the program automatically transfers focus to the box on the left, just as one would when solving a more complicated math problem on paper. That is, the cursor or highlighted box 112 passes from right to left in the same manner as a typical student would solve such a problem on paper. Thus, the grid math mode allows the user to write out and solve a math problem in the same manner as a typical student. It also means that the teacher need not adapt the lesson for the disabled student, as required by so many existing assistive communication systems. Grid math can also print, save, and log all content with a time and date stamp.

FIG. 14 depicts a "more . . . " function assigned to button 122E in user interface 122 at the main level of the system. One of the additional functions available when this button is selected is a settings mode that allows the user to toggle on/off a word prediction feature of the writing mode. The user can also select a word prediction mode. The various word prediction modes offer a full dictionary, a list of commonly used words, and a custom word list that is automatically appended as the user writes. This custom word list mode can increase the speed of the user's writing.

The invention is not limited to the above description. For example, in addition to the grid math mode, the invention contemplates other two-dimensional grid-based activities. One such activity includes an art module. The art module is grid based, but with no spaces between the cells of the grid. One method of implementing the art module is a mosaic-style art form, in which the user draws a picture pixel by pixel (i.e., box by box). Movement arrows as used in the grid math module may be employed, as may a line drawing feature. In one embodiment, the art module opens with a grid of pixels that is 25 wide by 40 high, with each pixel ¼"×¼". The user can change the size of the grid and the number of pixels per inch, with a range from 12 pixels per inch to 1 pixel per inch. The user can select a standard color palette or make a custom color palette of up to 16 colors. The user can move around the cells and fill them in with the palette colors. Each time a cell is filled, the program may preferably move to the cell on the right, same row. At the end of a row, it may stop or proceed to the leftmost cell on the next row down. The user can move around the cells. The user can choose to switch out a color from the palette and replace it with another color. The written work can be printed using any printer on the network that the computer is attached to. The print out may include the name, date, and printing time. The written work can be saved as a new file, with a standard title, an automatically generated title or a new title that the user writes. Before beginning to write, the user can open a file and begin typing from the last cursor location.

As another example, an alternate grid mode may be employed for playing chess, battleship, concentration/memory, or any activity that involves a letter/number x/y grid.

Additional modes of operation are also contemplated, such as graphing data points, editing existing written work, organizing written work by chapter, adding footnotes to written work, taking a standardized test without assistance, and musical composition.

Also, in addition to simply printing out text or other work on paper, the invention contemplates printing content to adhesive labels or stickers 400 (see FIG. 28) that can be easily transferred to a workbook or a teacher's handout. In many classroom settings, typical children are provided with sheets and books with spaces in which to fill answers to questions. These require the use of a pen or pencil, and that requires the use of fine motor skills. Individuals with fine motor skill impairment are often at a loss with such worksheets and workbooks and similar assignments. This feature of the invention allows the user to take a quiz or spelling or math test or use workbooks and handouts the way typical children do.

Another mode of operation is a music writing mode. Before beginning to write, the user may select a clef to write in, and the text box displays a staff with the clef. The user may then select a time signature. The user then has the option to set the key of the music to be written. The user selects staff lines or spaces between lines, and then may select length of note. The note is displayed on the staff. The user has the option to add additional notation such as sharp, flat, staccato, end of bar, etc. The written work can be printed using any printer on the network to which the computer is connected. The print out may include the name, date, and printing time. The written work can be saved as a new file, with a standard title, an automatically generated title or a new title that the user writes. Before beginning to write, the user can open a file and begin typing from the last cursor location. Before beginning to write, the user can open an existing file, scroll through the file and edit the file. The file can be exported to a pre-existing software format (e.g., SIBELIUS™, sold by Avid Technology, Inc. of Burlington, Mass.; FINALE™, sold by MakeMusic, Inc., of Eden Prairie, Minn.; or the like) so that the music can be played or shared. Optionally, instead of or in addition to five-lined music staff, six-lined guitar tablature may be included.

Additionally, the six-switch array is described as being approximately 44" long, however it need not be so specifically dimensioned. An approximately 28" long embodiment is contemplated. It should be noted that, the smaller the switch array gets, the harder it gets to use for a person with a movement disorder; the space between buttons is part of what makes it viable. Nevertheless, the software itself offers potential even without any switch array. The grid math, art, music and scientific graphing modes can be useful even if used with a standard alphanumeric keyboard. As an example, the number keys one through six can correspond to the six switches on the switch array.

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art.

What is claimed is:

1. Apparatus providing assistance in communication of user expressions from users and academic achievement to such users possessing fine motor coordination impairment, comprising:
    a computer having software and a storage medium having a plurality of potential user expressions;
    at least one user screen in communication with said computer having software upon which a plurality of potential user expressions are displayable, said at least one user screen comprising a plurality of user screen sections; and
    a plurality of widely spaced apart physical torso operated controls mounted at an acute angle to the user, in association with but separate from said user screen, each one of said controls always corresponding to and associated with a respective same one of said user screen sections and corresponding to said potential user expressions displayed on said user screen sections,
    wherein when the user wishes to select one of said potential user expressions, the user operates said control that corresponds to the one of said user screen sections upon which the desired potential user expression appears using substantially only gross motor movements.

2. An apparatus according to claim 1, wherein the physical torso-operated controls are momentary push switches.

3. An apparatus according to claim 2, further comprising at least one sensory feedback mechanism in communication with each of said physical torso-operated controls, wherein when the user successfully operates one of said physical torso-operated controls, said corresponding sensory feedback mechanism is activated to confirm successful operation of said physical torso-operated control to the user.

4. An apparatus according to claim 1, wherein spacing between adjacent of said widely spaced apart controls is at least 3 inches between the controls.

5. An apparatus according to claim 1, wherein a size of each of said widely spaced apart controls is at least 1 inch across.

6. An apparatus according to claim 1, wherein positions of respective said controls are selectively adjustable but remain widely spaced apart and each corresponding to and associated with a respective one of said user screen sections.

7. An apparatus according to claim 1, said apparatus providing assistance to pre-literate individuals, wherein said plurality of user expressions are image-based.

8. An apparatus according to claim 7, wherein said at least one user screen further comprises at least three user screen sections and said plurality of widely spaced apart controls further comprises at least three of said controls, each of said controls corresponding to a respective one of said user screen sections, wherein operation of one of said three controls selects an image-based user expression appearing on the corresponding one of said user screen sections.

9. An apparatus according to claim 8, wherein operation of one of said three controls selects an image-based user expression appearing on the corresponding one of said user screen sections and causes said selected expression to be displayed on a supplemental display.

10. An apparatus according to claim 8, further comprising an operator interface, in communication with said computer, enabling an operator distinct from the user to select image-based user expressions from said storage medium to present to the user on said user screen sections.

11. An apparatus according to claim 10, said image-based user expressions being sorted into categories, said operator interface further comprising:
    a plurality of category buttons, each of said category buttons being associatable with a corresponding of said categories of said image-based user expressions; and
    an image field,
    wherein when one of said category buttons is activated by the operator, a plurality of image-based user expressions from the selected category appear in said image field.

12. An apparatus according to claim 11, said operator interface further comprising a preview field having three image sections each corresponding to one of said user screen sections, wherein said image-based user expressions appearing in said image field are selectable by the operator to appear in said preview field and thence be sendable to said user screen sections.

13. An apparatus according to claim 12, said operator interface further comprising functionality buttons enabling selection by the operator amongst different operational modes in how said image-based user expressions are selectable and presentable to said user screen sections.

14. An apparatus according to claim 13, said functionality buttons restricting to which of a subset of said user screen sections said selected image-based user expressions are presented to the user depending upon which of said operational modes is selected.

15. An apparatus according to claim 14, said operational modes including at least one of i) error free choosing mode, in which a single of said image-based user expressions is selected and sent to the user; ii) choose from two of said image-based user expressions mode; iii) choose from three of said image-based user expressions mode; iv) choose from a group of said image-based user expressions exceeding the number of said user screen sections mode; v) yes and no mode, in which a single of said image-based user expressions is selected and sent to one of said user screens along with yes and no choices for the other two of said user screens; vi) scanning mode, in which multiple of said image-based user expressions are sent and are serially highlighted one at a time.

16. An apparatus according to claim 8, wherein said at least three user screen sections further comprises one of i) three discrete display screens, or ii) three sections of a single display screen.

17. An apparatus according to claim 1, said apparatus providing assistance to literate individuals, wherein said plurality of user expressions are characters.

18. An apparatus according to claim 17, wherein said at least one user screen comprises:
a two-dimensional content area having a plurality of content locations; and
a user interface functionality area having six user screen sections.

19. An apparatus according to claim 18, said plurality of widely spaced apart physical torso-controlled controls further comprises six of said controls, each of said controls corresponding to a respective one of said user screen sections, wherein operation of one of said six controls selects content appearing on the corresponding one of said user screen sections.

20. An apparatus according to claim 19, wherein said software comprises a plurality of modules, each of said modules corresponding to one of a plurality of operational modes in which said apparatus is selectively usable.

21. An apparatus according to claim 20, a first of said modules comprising a free writing module, wherein said content includes letters distributed initially with multiple letters assigned to each of said six user screen sections and then, upon activation of one of said controls, the letters assigned to the activated of said controls being distributed singly to each of said controls.

22. An apparatus according to claim 20, a second of said modules comprising a yes-no module, wherein said content includes at least yes and no user responses.

23. An apparatus according to claim 20, a third of said modules comprising a linear math module, wherein said content includes characters including at least two of numbers, operands, and units, distributed initially with multiple characters assigned to each of said six user screen sections and then, upon activation of one of said controls, the characters assigned to the activated of said controls being distributed singly to each of said controls.

24. An apparatus according to claim 20, a fourth of said modules comprising a grid math module, wherein said content includes characters including at least numbers and arrows, distributed initially with multiple characters assigned to each of said six user screen sections and then, upon activation of one of said controls, the characters assigned to the activated of said controls being distributed singly to each of said controls, and
wherein selection of one of said arrows chooses one of said content locations in said two-dimensional content area, and subsequent selection of one of said numbers places said selected number in the last chosen of said content locations.

25. An apparatus according to claim 20, wherein one of said controls is assigned a function in one of said operational modes selectively enabling the user to switch to another of said operational modes.

26. An apparatus according to claim 18, wherein said six user screen sections comprise at least one of i) three individual screens each having two of said six user screen sections; ii) two individual screens each having three of said six user screen sections; or iii) one main screen having six of said six user screen sections.

27. An apparatus according to claim 18, wherein content appearing on each of said six user screen sections comprises one or multiple characters.

28. An apparatus according to claim 26, wherein when one character appears on one of said six user screen sections, user activation of said corresponding of said controls via upper body gross motor movement of the torso causes said one character to appear in one of said content locations in said two-dimensional content area, and
wherein when multiple characters appear on one of said user screen sections, user activation of said corresponding of said controls via upper body gross motor movement of the torso causes said corresponding multiple characters to be spread out amongst multiple of said user screen sections for subsequent eventual selection of a single character.

29. An apparatus according to claim 28, wherein said characters comprise at least one of letters, numbers, symbols, content location selectors, or operational mode selectors.

30. An apparatus according to claim 18, further comprising a supplemental display, viewable by at least one other person, upon which content selected to appear in said two-dimensional content area also appears.

31. An apparatus according to claim 18, wherein content displayed in said two-dimensional content area is savable onto said storage medium as a file.

32. An apparatus according to claim 31, wherein said file is retrievable and editable from said storage medium.

33. An apparatus according to claim 18, said computer further comprising a communication mechanism linkable to an external computer, wherein content displayed in said two-dimensional content area is transferable to and from the external computer.

34. An apparatus according to claim 18, said apparatus further comprising a printer in communication with said computer, wherein content displayed in said two-dimensional content area is printable.

35. An apparatus according to claim 34, wherein said content is printable onto labels adapted to be adhered to a worksheet or workbook.

36. A method of enabling or assisting communication of user expressions from users and academic achievement to such users possessing fine motor coordination impairment, comprising the steps of:

i) providing at least one user screen having a plurality of user screen sections;

ii) providing a first plurality of potential user expressions on the plurality of user screen sections; and iii) providing a plurality of widely spaced apart physical torso-operated controls mounted at an acute angle to the user, in association with but separate from the at least one user screen, each one of the torso-operated controls always corresponding to and associated with a respective one of the user screen sections and corresponding to the potential user expressions displayed on the user screen sections, wherein when the user wishes to select a potential user expression, the user operates the control that corresponds to the user screen section upon which the desired user expression appears using substantially only gross motor movements of the torso.

37. A method of enabling or assisting communication according to claim 36, step ii) further comprising the step of enabling an operator, distinct from the user, to select the first plurality of potential user expressions as a subset from a larger second plurality of potential user expressions, said second plurality of potential user expressions being stored on a computer readable storage medium in communication with the at least one user screen.

38. A method of enabling or assisting communication according to claim 37, wherein the potential user expressions are image-based user expressions.

39. A method of enabling or assisting communication according to claim 38, further comprising the steps of:

providing an operator interface having an image field for the operator;

organizing the second plurality of potential user expressions into a plurality of categories;

providing a plurality of category buttons associated with the operator interface corresponding to the categories of potential user expressions;

wherein when one of the category buttons is activated, a plurality of image-based user expressions from the selected category appear in the image field.

40. A method of enabling or assisting communication according to claim 39, further comprising the steps of:

providing a preview field having a plurality of image sections each corresponding to one of the user screen sections;

selecting image-based user expressions appearing in said image field to appear in the preview field; and sending the selected image-based user expressions appearing in the preview field to the user screen sections.

41. A method of enabling or assisting communication according to claim 40, said sending step further comprising the step of varying at least one of the size or the position of an image-based user expression on a user screen section.

42. A method of enabling or assisting communication according to claim 36, further comprising the step of providing confirmatory sensory feedback to the user upon successful operation of one of the widely spaced apart physical torso-operated controls by the user.

43. A method of enabling or assisting communication according to claim 36, further comprising the step of partitioning the at least one user screen into a two-dimensional content area having a plurality of content locations and a user interface functionality area having six user screen sections, said step ii) further comprising the steps of providing a plurality of characters as the potential user expressions, the characters including at least one of letters, numbers, symbols, content location selectors, or operational mode selectors.

44. A method of enabling or assisting communication according to claim 43, the plurality of widely spaced apart physical torso-operated controls further including six widely spaced apart controls, each of the controls corresponding to a respective one of the user screen sections, further comprising the steps of operating one of the six controls to select content appearing on the corresponding one of the user screen sections.

45. A method of enabling or assisting communication according to claim 44, wherein content appearing on each of the six user screen sections includes one or multiple characters.

46. A method of enabling or assisting communication according to claim 45, further comprising the steps of:

when one character respectively appears on each of the six user screen sections, activating one of the physical torso-operated controls to cause the corresponding one character to appear in one of the content locations in the two-dimensional content area; and when multiple characters respectively appear on each of the user screen sections, activating one of the physical torso-operated controls to cause the corresponding multiple characters to be spread out amongst multiple of the user screen sections for subsequent eventual selection of a single character.

47. A method of enabling or assisting communication according to claim 43, further comprising the steps of:

providing a supplemental display, viewable by at least one person other than the user, in communication with the at least one user screen and sending selected content appearing in the two-dimensional content area to the supplemental display.

48. A method of enabling or assisting communication according to claim 43, further comprising the step of uploading and downloading content to/from the two-dimensional content area from/to an external computer.

49. A method of enabling or assisting communication according to claim 43, further comprising the step of saving content in the two-dimensional content area on a computer readable storage medium.

50. A method of enabling or assisting communication according to claim 43, further comprising the step of printing content in the two-dimensional content area.

51. A method of enabling or assisting communication according to claim 50, said printing step further comprising the steps of:

printing the content onto labels; and adhering the printed-on labels onto a worksheet or workbook.

* * * * *